(12) United States Patent
Rowley

(10) Patent No.: US 6,485,666 B1
(45) Date of Patent: Nov. 26, 2002

(54) POST EXTRUSION PROFILE PROCESSING

(76) Inventor: William W. Rowley, 35 Wilding Chase, Chagrin Falls, OH (US) 44022

( * ) Notice: Subject to any disclaimer, the term of this patent is extended or adjusted under 35 U.S.C. 154(b) by 0 days.

(21) Appl. No.: 09/559,474

(22) Filed: Apr. 27, 2000

Related U.S. Application Data

(63) Continuation-in-part of application No. 09/038,881, filed on Mar. 11, 1998, now abandoned.

(51) Int. Cl.[7] .......................... B29C 49/22; B29C 43/20; B29C 45/16; B29D 22/00
(52) U.S. Cl. ...................... 264/506; 264/519; 264/520; 264/521; 264/319; 264/327; 264/328.14; 264/328.15
(58) Field of Search ................... 264/506, 515, 264/519, 521, 520, 319, 328.14, 328.15, 327

(56) References Cited

U.S. PATENT DOCUMENTS

| | | | |
|---|---|---|---|
| 3,235,632 A | * 2/1966 | Lemmer et al. | ......... 264/209.5 |
| 3,370,115 A | 2/1968 | Wood | |
| 3,470,900 A | 10/1969 | Rothauser | |
| 3,719,209 A | 3/1973 | Rush et al. | |
| 3,723,946 A | 3/1973 | Weatherup et al. | |
| 3,806,301 A | * 4/1974 | Osterhagen et al. | ......... 425/384 |

(List continued on next page.)

FOREIGN PATENT DOCUMENTS

| | | |
|---|---|---|
| CA | 938952 | 12/1973 |
| DE | 1130996 | 6/1961 |
| DE | 2838731 | 3/1980 |
| EP | 033587 | 8/1981 |
| EP | 223754 | 5/1987 |
| FR | 2395123 | 2/1974 |
| GB | 1172566 | 12/1969 |
| GB | 1421530 | 1/1976 |
| JP | 42-16434 | 9/1967 |

(List continued on next page.)

*Primary Examiner*—Suzanne E. McDowell
(74) *Attorney, Agent, or Firm*—Buckingham, Doolittle & Burroughs, LLP

(57) ABSTRACT

This invention relates to the post-extrusion processing of extruded profiles in an economic manner. The first process step involves heating at least a portion of the extruded profile in a preheated profile heating means to a first temperature at which the essentially linear profile becomes formable or pliable or bendable, yet which still has at least some degree of structural integrity at this point which permits it to be physically manipulated without compressing the profile by the application of external pressure or by the weight of gravity itself. This first temperature is less than a subsequent second temperature, at which the profile becomes melt processable effecting radial expansion under pressure or melt fusion under pressure. At least one end of the profile remains unheated, and preferably, two ends remain unheated. The profile is then transferred into a heated die having a cavity therein, the cavity having at least one region where an internal cross-sectional dimension of the cavity is larger than an external cross-sectional dimension of said profile. The cavity temperature of the die is sufficient to heat the profile from the first temperature to the second temperature. At least one end of the profile is sealed and a pressurized medium is injected into an opposed end of the profile to conform the formable portions of the profile with the internal diameter of the cavity, thereby creating the profile. The first temperature is greater than or equal to approximately 40° C., preferably 65° C. which is less than or equal to approximately 95% of said second temperature. Alternatively, a temperature difference between the first and second temperatures is between approximately 5 and 30% inclusive when compared to the second temperature. More preferably, this difference will be between approximately 8 and 15% inclusive.

135 Claims, 9 Drawing Sheets

U.S. PATENT DOCUMENTS

| | | | |
|---|---|---|---|
| 3,843,300 A | 10/1974 | McFalane | |
| 3,861,847 A | 1/1975 | Barnett | |
| 3,890,079 A | 6/1975 | Slater | |
| 3,917,497 A | 11/1975 | Stickler | |
| 3,929,958 A | 12/1975 | Parmann | |
| 3,950,459 A | 4/1976 | Seefluth | |
| 3,986,810 A | 10/1976 | La Branche et al. | |
| 4,005,879 A | 2/1977 | Berger et al. | |
| 4,009,982 A | 3/1977 | Maier | |
| 4,032,281 A * | 6/1977 | Rakovsky | 425/384 |
| 4,039,212 A | 8/1977 | Skarud | |
| 4,081,190 A | 3/1978 | Itzler | |
| 4,113,813 A | 9/1978 | Wilson | |
| 4,135,961 A | 1/1979 | Yoshizawa et al. | |
| 4,140,739 A | 2/1979 | Cotten | |
| 4,150,087 A * | 4/1979 | de Putter et al. | 264/296 |
| 4,152,817 A | 5/1979 | Cotten | |
| 4,175,917 A | 11/1979 | Cotton | |
| 4,177,237 A | 12/1979 | Ueno et al. | |
| 4,209,597 A | 6/1980 | Bremholt | |
| 4,264,490 A | 4/1981 | Berejka | |
| 4,264,661 A | 4/1981 | Brandolf | |
| 4,266,815 A | 5/1981 | Cross | |
| 4,276,010 A * | 6/1981 | Shartzer | 425/143 |
| 4,316,870 A | 2/1982 | Rowley | |
| 4,318,681 A | 3/1982 | Aston et al. | |
| 4,325,687 A | 4/1982 | Akutin et al. | |
| 4,342,800 A | 8/1982 | Changani et al. | |
| 4,343,864 A | 8/1982 | Berejka | |
| 4,353,860 A | 10/1982 | Gordon | |
| 4,446,084 A | 5/1984 | Rowley | |
| 4,490,421 A | 12/1984 | Levy | |
| 4,525,136 A | 6/1985 | Rowley | |
| 4,575,044 A | 3/1986 | Gentry | |
| 4,614,208 A | 9/1986 | Skarelius | |
| 4,664,423 A | 5/1987 | Rowley | |
| 4,690,632 A | 9/1987 | Carrow | |
| 4,783,303 A | 11/1988 | Ingram | |
| 4,803,033 A | 2/1989 | Rowley | |
| 4,887,852 A | 12/1989 | Hancock | |
| 4,991,876 A | 2/1991 | Mulvery | |
| 5,407,613 A | 4/1995 | Schulte | |
| 5,490,966 A | 2/1996 | Peterson et al. | |
| 5,527,503 A | 6/1996 | Rowley | |
| 5,540,580 A | 7/1996 | Takada | |
| 5,562,960 A * | 10/1996 | Sugiura et al. | 428/35.7 |
| 5,578,262 A | 11/1996 | Marcus | |
| 5,622,670 A | 4/1997 | Rowley | |

FOREIGN PATENT DOCUMENTS

| | | |
|---|---|---|
| JP | 51-71376 | 6/1976 |
| JP | 5 9012-817 | 1/1984 |
| WO | WO 84/01988 | 5/1984 |
| WO | WO 85/03251 | 8/1985 |

* cited by examiner

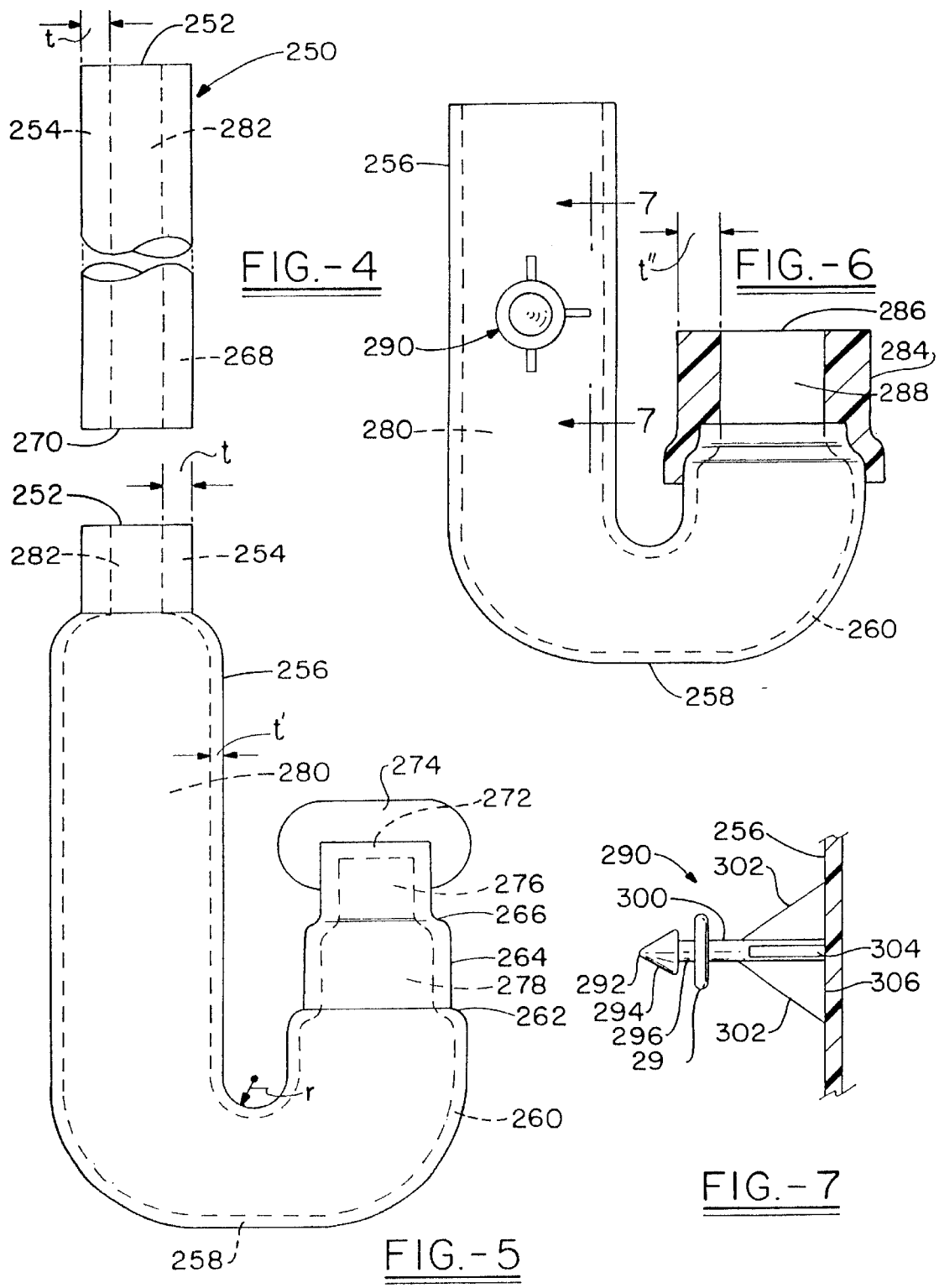

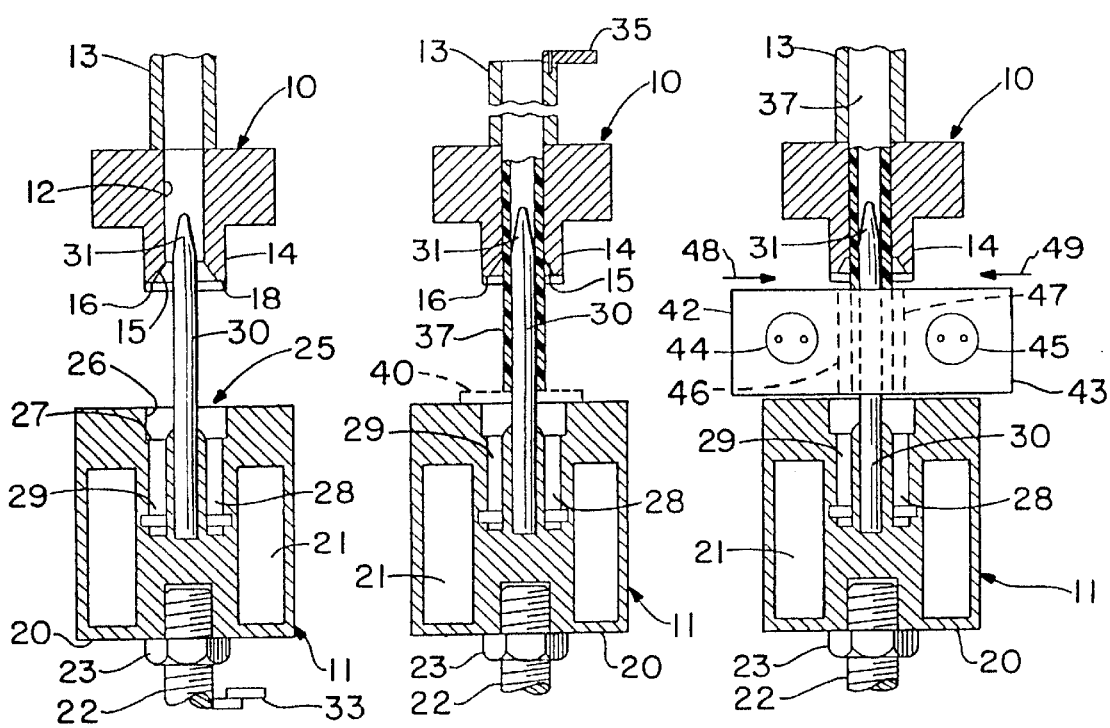
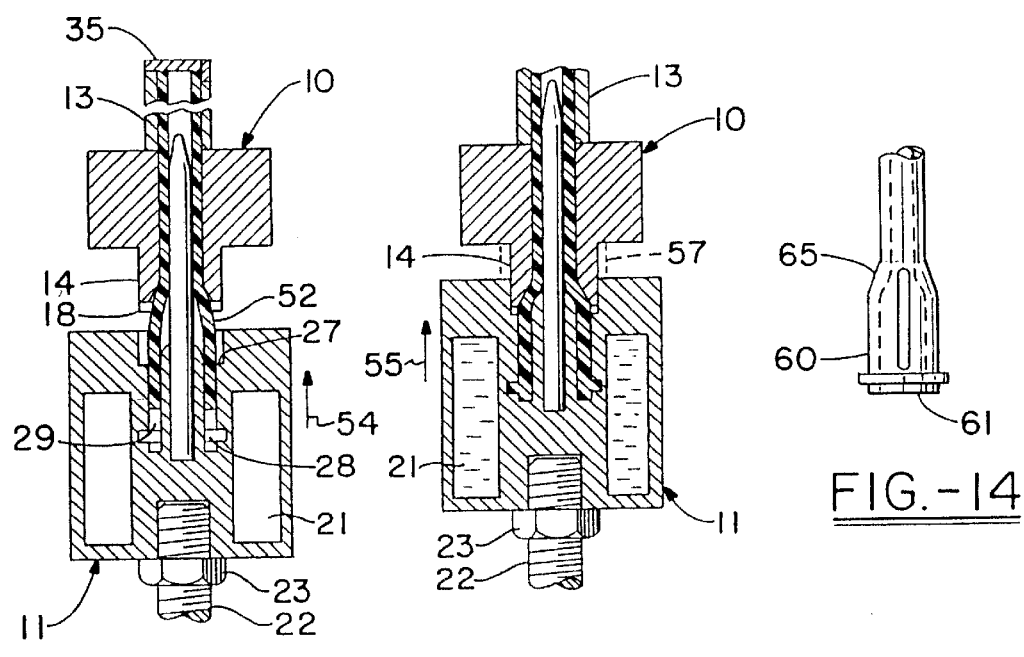

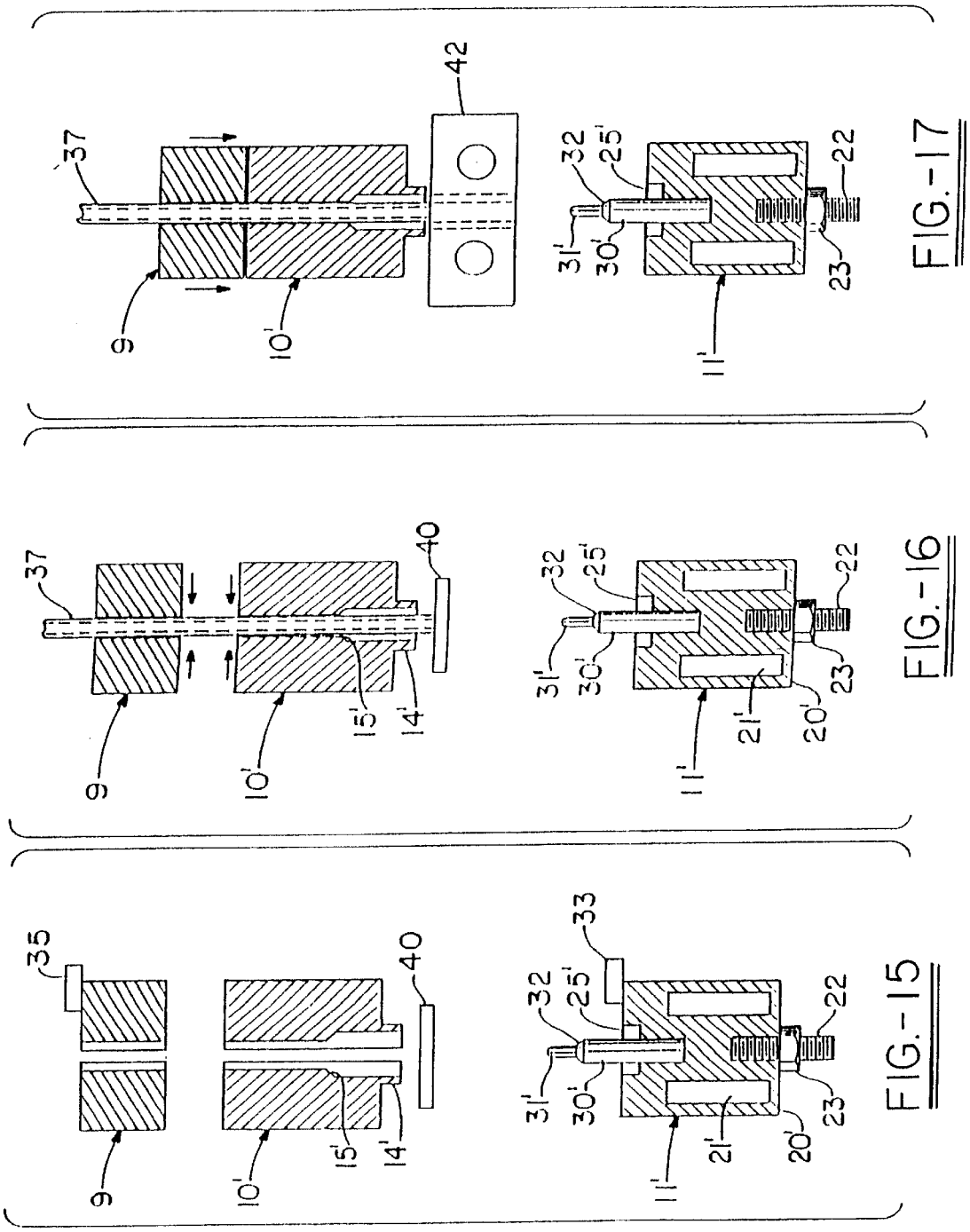

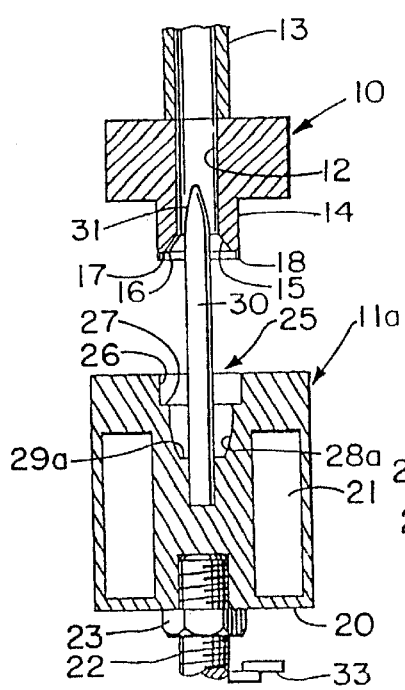
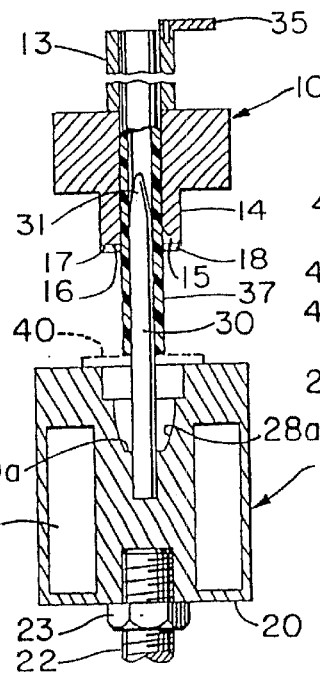
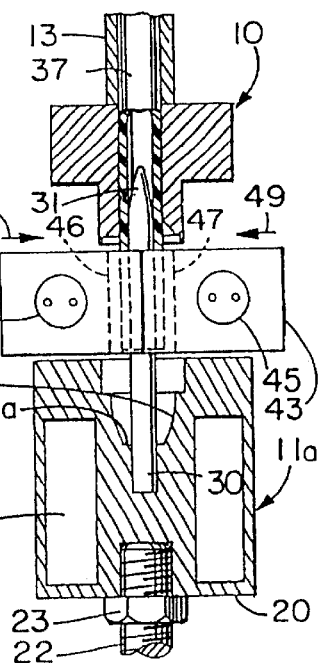
FIG.-24     FIG.-25     FIG.-26
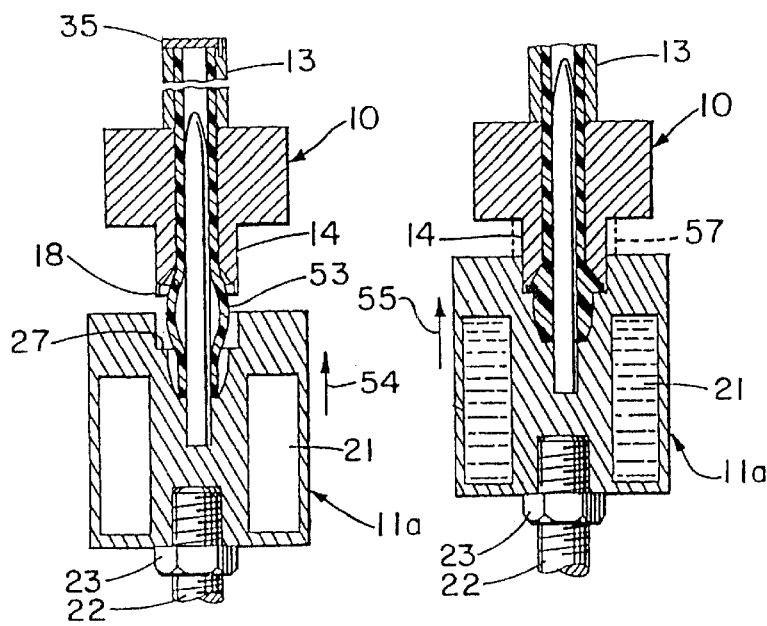
FIG.-27     FIG.-28

POST EXTRUSION PROFILE PROCESSING

CROSS-REFERENCE

This invention is a continuation-in-part of U.S. application Ser. No. 09/038,881, filed on Mar. 11, 1998, entitled Post-Extrusion Profile Processing, now abandoned.

TECHNICAL FIELD

The invention relates to the post-extrusion processing of extruded profiles, such processing including blow molding the profile to a larger internal diameter while correspondingly imparting at least one bend into the expanded profile as well as optionally compression molding ends onto the profile, blow molding a second region of the profile into another shape, e.g., bellows or in-line check valve, and injection overmolding. In one embodiment, the process will include the bending of at least two angles into the profile, the angles being non-planar with respect to each other. The process involves heating at least a portion of the essentially linear extruded profile in a profile heating means to a first temperature at which the profile becomes formable or pliable or bendable, yet which still has at least some degree of structural integrity at this point which permits it to be physically manipulated without compressing the profile by the application of external pressure or by the weight of gravity itself. This preheating step is followed by additional heating to a second higher temperature at which the profile becomes melt processable and permitting radial expansion under pressure or melt fusion under pressure.

BACKGROUND OF THE INVENTION

There are various primary polymer processing technologies which are applicable in the manufacture of parts of various designs and shapes. Each technology as discussed below, has design constraints which limit its implementation in the fabrication of variously configured components.

Blow molding is a process typically used for the production of hollow thermoplastic components. The most widely known blow molded objects are bottles, jars, cans, and containers of all kinds for the food, beverage, cosmetic, medical, pharmaceutical and home products industries. Larger blown containers are often used for the packaging of chemicals, lubricants, and bulk materials. Among other blow molded items are balls, bellows, and toys. For the automotive industry, fuel tanks, car bumpers, seat banks, center consoles, and armrest and headrest skins are blow molded.

The most prevalent blow molding grade plastic raw material is high-density polyethylene. Most of the milk jugs are made from this polymer. Other polyolefins, e.g., low density polyethylene, polypropylene, are also widely processed by blow molding. Depending on the application, styrenes, vinyls, polyesters, polyamides, polyurethanes, polycarbonates, and other thermoplastics are blow molded.

More than half of all blow molded parts are made by extrusion blow molding. The extrusion process is defined as making a product (extrudate) by forcing material through an orifice or die. The extrusion blow molding process consists of five steps: (1) extrusion of a plastic parison (hollow plastic tube); (2) closing of two mold halves on the parison, clamping the mold and cutting the parison; (3) blowing the parison against the cooled walls of the mold cavity, calibrating the opening, and holding it under air pressure during the cooling time; (4) opening the mold and removing the blown part; and (5) finishing the part by trimming off the flash.

A basic blow molding machine comprises an extruder, an extrusion head, a press section containing the mold, a calibration, a parison separation device, and an electrical control station. This fundamental unit is called a "blow-and-drop" machine. Plastic pellets are fed into the hopper mounted to the extruder. A motor-driven rotatable screw moves the material toward the blow molding or extrusion head and through the die.

Most extruders used in the blow molding are single-screw, either smooth-barrel or grooved barrel. Extruder output is determined by the geometry of the water-cooled feed zone and the feed capacity of the screw per revolution. With continued extrusion, a symmetrical or asymmetrical tube (parison) is formed by the die and pin in the extrusion head. An asymmetrical parison is developed by shaping or ovalizing the tooling in the head. Die and pin often move relative to each other during the extrusion process. This is caused by parison programming. Continuous extrusion is used with shuttle-type and wheel-type machines. Since the parison is extruded continuously, an open mold is positioned periodically around the parison. With the parison at its proper length, the mold is closed and clamped, and the parison is cut. Thereafter, the mold moves back under the calibration station, where the parison is blown into the shape dictated by the mold cavity. The neck of the bottle or container is calibrated simultaneously, in most cases by top blowing. Objects without openings are often needle-blown. Single-station shuttle machines have the mold positioned at the left or the right of the extrusion head while double-station machines have molds to the right and left of the head.

A blow molding machine's productivity is governed by its cycle time, 80% of which is cooling time. This long period of time is required for cooling the hot plastic material prior to demolding, to prevent post-warpage and dimensional distortion of the finished part. Modern molding machines are built-in stations for post-mold cooling. Articles are transferred out of the mold into post-cooling devices that basically consist of a cooling mold, i.e., mold without pinch-offs. Cooling is accomplished via liquid cooling in the shell of the mold, and $CO_2$, refrigerated air, or nitrogen cooling inside the container. Advantages are seen in shorter cycle times and control of the part distortion inherent in parts with asymmetric configuration and thick walls.

After leaving the cooling stations, containers are accepted by trim or punching devices for flash removal. Wall thickness control and minimal generation of flash avoid the problems associated with flash removal, e.g., the need to regrind and reprocess the flash and the possibility that its removal may expose seams, which in turn can contribute to container cracking and splitting on impact. Continuous blow molding machines can cost between $250,000 to $1.5 million and are typically run at parison extrusion rates of ten feet per minute using pressures of from between 80–125 psi. This process has significant inherent rate limitations.

The other type of blow molding is injection blow molding which is a two stage process for producing completely finished plastic containers. In the first stage, the plastic is injection molded into a preform cavity where the parison is formed. The neck finish of the container is molded, as well as the shape of the parison, as the plastic is injected around the core pin and into the preform. Temperature and conditioning of the parison takes place at this stage. The parison then is transferred via the core pin to the blow mold, and air is introduced through the core pin to blow the parison to the shape of the blow mold. The completed container is then transferred to the ejection station.

Injection blow molding offers a number of advantages: (1) it produces scrap-free, close tolerance, completely finished bottles that do not require any secondary operations; (2) it offers positive weight control in the finished container; (3) neck shapes and finishes, internally and externally can be molded with accuracy; (4) repeatable weight and bottle dimensions are possible with the process; (5) improved clarity and strength due to the effect of some amount of biaxial orientation; (6) bottles are controlled and oriented at the ejection station; and (7) there is a minimum of operator supervision required. There are however, limitations to this process, relating primarily to the sizes and shapes of bottles that can be produced profitably on existing injection-blow molding machines.

Compression molding has been used for such thermosetting compounds are urea, phenolic, epoxy, melamines and rubber. The most apparent advantage of compression molding of thermosets is the simple system involved. The material is placed in a heated cavity and is pressurized for the required cure time. Tooling costs are inexpensive because of the simplicity. Material is not wasted because of the absence of sprues and runners. Consistency of the part size is good and the absence of gate and flow marks reduce finishing costs. Depending on the part and material, positive, semi-positive and closed molds are used.

The compression molding press two platens that close together, applying heat and pressure to mold material into the wanted shape. Most compression presses are hydraulically operated. Heating of the molds can be done for shallow parts by using cartridge or strip heaters in the platen. Deeper parts need electrical cartridge-type heaters in the platen or require steam or hot-oil systems.

Plastics extrusion processing is defined as converting plastic powder or granules into a continuous uniform melt and forcing this melt through a die which yields a desired shape. This melted material must then be cooled back to its solid state as it is held in the desired shape, so an end product can be realized.

Single screw extruders are the most common in use today. Extruders diameters range from ½" to 12" in a barrel inner diameter. The hopper of an extruder accepts granules or powder which pass through a vertical opening in the feed section where they are introduced to a rotating screw with spiral flights. The material is conveyed along the screw and heated inside the barrel, with the goal being to reach the die system in a totally melt phase at an acceptable and homogeneous temperature, and being pumped at a consistent output rate.

The barrel is heated and cooled by heater/cooler jackets surrounding its outer wall to aid in the melting of the material on the screw. Heater/coolers are electrically heated through heating elements cast into aluminum, with either cooling tubes also cast into the aluminum or deep fins cast on the outer surfaces of the heaters/coolers to allow air cooling of the barrel via blowers. Temperature of the various barrel zones are set according to the material, screw design, and processing goals. These barrel zone temperature settings vary widely, depending on the material used or the product being made while the control of the temperature at the deep barrel thermocouple position for a given situation is typically maintained within a close tolerance range to minimize variations of material exiting the die system. The screw is the heart of the extrusion process and designs for which have varied with time as understanding of the melting process of the plastic material moving along the screw has increased. Since some materials tend to trap air as they start to melt, or contain moisture or volatiles, that will create porosity in the final product, a vent is typically positioned at a point in the barrel to remove the porosity by allowing the escape of gases.

The melt must be shaped and cooled by product sizing and cooling equipment to its solid phase while forming a product that falls within given size tolerances. The dies to create the end products from a melt are varied depending on the shapes involved. Pipe and tubing are cooled through simple, open water troughs, or pulled through vacuum sizing tanks, where the melt is held in a sizing sleeve of a short time in a water filled vacuum chamber. Custom profiles come in various shapes and are commonly made of materials that have high melt viscosity, so they are easy to hold shape while they cool. These products can be cooled by forced air, water troughs, or water spray methods. The methods of getting the many shapes include various sizing fixtures to hold the extrudate as it is pulled through the system and cooled. The material can also be coextruded, i.e., made with more than one material. Coextrusion typically requires a dual-extrusion head and multiple extruders using a specialized die system to bring these layers together with a common sizing and shaping system. Extruders can cost from $20,000 to $300,000 depending on size and options and the process is generally not rate limited as is the case with blow molding. Rates of 100 feet per minute are routinely achieved.

Injection molding of thermoplastics is a process by which plastic is melted and injected into a mold cavity void, defined in this instance as the void volume between the mold core body and the mold cavity. Once the melted plastic is in the mold, it cools to a shape that reflects the form of the cavity. The resulting part is a finished part needing no other work before assembly into or use as a finished part. The injection molding machine has two basic components: an injection unit to melt and transfer the plastic into the mold; and a clamp to hold the mold shut against injection pressures and for parts removal. The injection unit melts the plastic before it is injected into the mold, then injects the melt with controlled pressure and rate into the mold. After the injection cycle, the clamp gently opens the mold halves.

Important factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

If the polymer is a thermoset, injection molding uses a screw or a plunger to feed the polymer through a heated barrel to decrease its viscosity, followed by injection into a heated mold. Once the material fills the mold, it is held under pressure while chemical crosslinking occurs to make the polymer hard. The cured part is then ejected from the mold while at the elevated temperature and cannot be reformed or remelted.

When thermoplastics are heated in an injection press, they soften and as pressure is applied, flow from the nozzle of the press into an injection mold. The mold has cavities that, when filled with the thermoplastic or thermoformable material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

This means that during an overmolding process, the polymeric material used must be sufficiently formable, by melting, such that it may be forced to flow into and around the other preformed element(s)(e.g., a core insert, often polymeric in nature and/or polymer tube(s)). During this thermomelting process, heat and pressure are often applied.

To date, there has been no technology described which combines the features of extrusion, blow molding, compression molding and injection molding. The Prior Art has typically taught the need to pick and choose between various technologies. The invention described and discussed herein teaches a method of manufacturing a blow molded part using a predefined length of extruded profile as the raw material. The value of this approach is that the inherent rate limitations of blow molding are overcome as well as the size and shape restrictions on the part that can be manufactured. One of the unique aspects of the technology is the ability to take a part that is too long or too complex to blow mold and to add this to an extruded profile in a specific area. This approach is not limited to extruded profiles which are tubular in nature, but rather works with any hollow portion of the extruded profile. By using non-uniform heating, it is possible to expand or contract the profile in a given area, thereby creating additional novel features in the extruded profile, not possible using either extrusion or blow molding technologies in isolation. Additionally, by varying the extrusion rate of the profile, thicker and thinner profile regions can be created, these regions being targeted for subsequent post-processing.

SUMMARY OF THE INVENTION

In this invention, aspects of compression molding and blow molding are combined in a manner which is not achievable by using either technique alone. By starting with an extruded part, cut to a predefined length, it is possible to utilize post-extrusion processing encompassing blow molding and/or compression molding, and/or overmolding techniques on the extruded profile, imparting at least one non-coaxial bend into the extruded profile, and optionally at least two bends, with each bend being out-of-plane with respect to the other.

It is an object of this invention to fabricate an extruded profile using post-processing which includes blow molding at least one region of the profile and bending of the profile in the blow molded region.

These and other objects of this invention will be evident when viewed in light of the drawings, detailed description, and appended claims.

DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 4 is an elevational view of a hollow cylindrical tube with internal channel shown in ghost lines;

FIG. 5 is an elevational view of a J-shaped connector made from the hollow cylindrical tube of FIG. 4 showing the internal chamber in ghost lines;

FIG. 6 is an elevational view of a J-shaped connector with an overmolded end and an overmolded fastener affixed to a side wall of the connector;

FIG. 7 is a side view of the overmolded fastener shown in FIG. 6;

FIG. 9 is a fragmentary vertical section of the dies employed to form a belled end on the tubing in accordance with the present invention, such dies being shown separated from each other;

FIG. 10 is a view similar to FIG. 9 showing the tubing inserted through the female die, partially inserted on the male die and projection a predetermined distance from the former;

FIG. 11 is a view similar to FIGS. 9–10 showing the tube projection portion being heated;

FIG. 12 is a view similar to FIGS. 9–11 showing the dies being brought together;

FIG. 13 is a view similar to FIG. 12 showing the dies closed;

FIG. 14 is a fragmentary elevation of the end of the tube as formed by the process depicted in FIGS. 9–13;

FIG. 15 is a fragmentary vertical section of an alternative configuration for the dies employed to form a belled end on the tubing in accordance with the present invention, the dies being shown separated from each other;

FIG. 16 is a view similar to FIG. 15 showing the tubing inserted through the female die, and projecting a predetermined length therefrom;

FIG. 17 is a view similar to FIGS. 15–16 showing the tube projection portion being heated;

FIG. 24 is a fragmentary vertical section of the dies employed to form the sealing end of the tubing in accordance with the present invention, such dies being shown separated from each other;

FIG. 25 is a view similar to FIG. 24 showing the tubing inserted through the female die, partially inserted on the male die and projection a predetermined distance from the former;

FIG. 26 is a view similar to FIGS. 24–25 showing the tube projection being heated;

FIG. 27 is a view similar to FIGS. 24–26 showing the dies being brought together;

FIG. 28 is a view similar to FIGS. 24–27 showing the dies closed;

DETAILED DESCRIPTION OF THE INVENTION

Figure 1:
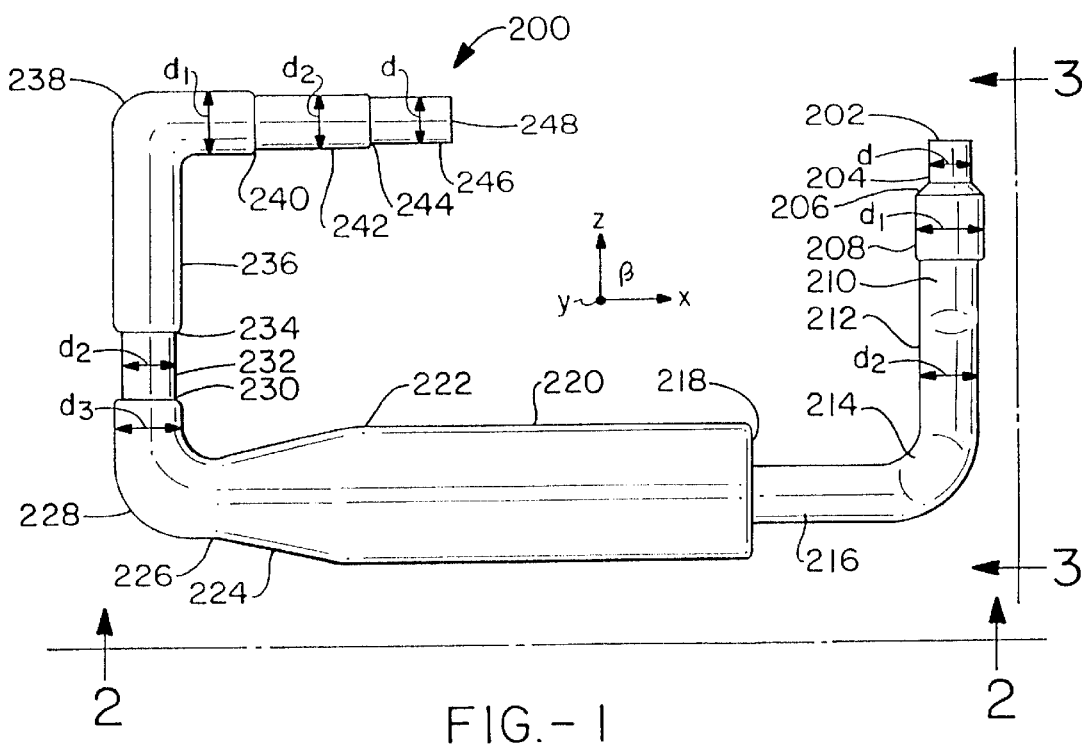
FIG. 1 is a plan view of a part made in accordance with the teachings of this invention.

Referring now to the drawings wherein the showings are for purposes of illustrating the preferred embodiment of the invention only and not for purposes of limiting the same, the Figures show predefined cut lengths of extruded profiles, preferably circular in cross-section, although this is not a required limitation of this invention, upon which various manipulative post-extrusion processing activities have been performed thereupon, resulting in various end configurations, e.g., compression molded sealing ends, compression molded belled ends, overmolded ends, etc., as well as various configurations between the ends of the tubing, e.g., blow molded expanded segments or regions including integrally molded check valves as well as non-coplanar bends.

Fabrication of Blow Molded Section(s)

Figure 2:
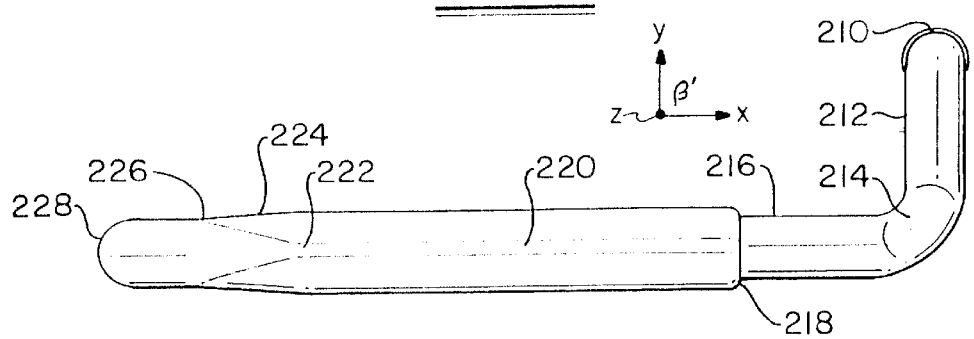
FIG. 2 is an elevational view of FIG. 1 taken along line 2—2.
Figure 3:
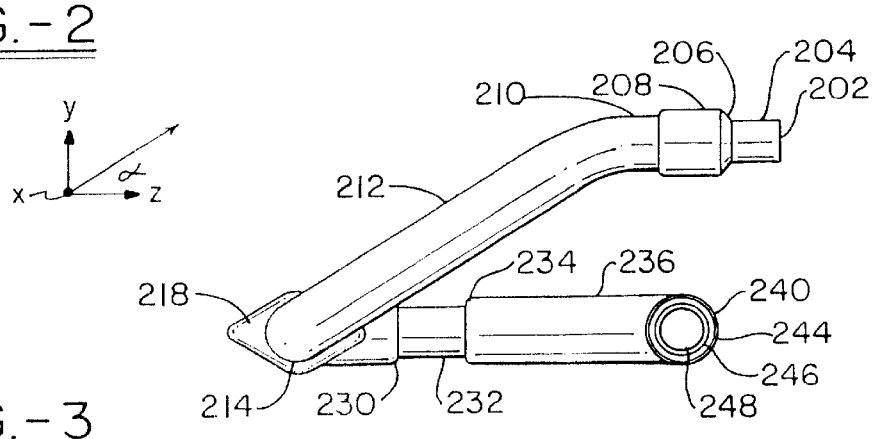
FIG. 3 is an elevational view of FIG. 1 taken along line 3—3.

FIGS. 1–3 show a connector 200 which has several bends, expanded segments and a complex geometric shape contained therein all features made by the utilization of various post-extrusion processing methods. The connector 200 is fabricated from an essentially straight piece of extruded tube profile, preferably tubular as shown in FIG. 4, the extruded connector of FIGS. 1–3 having an initial outer diameter d which is reflected by the part segments shown at 204, 232 and 246. By selectively heating various segments or regions of this tube, it is possible to impart not only different diametered regions, but also various bends, thereby creating a modified tube which is not possible to make by using any one processing technology in a cost-effective manner. For example, the tube as shown in FIG. 1, has an initial diametered region 204 with an initial outer diameter d adjacent to proximal end 202, an expanded larger diametered region 208 having an outer diameter $d_1$ with a tapered neck region 206 therebetween, an intermediate diametered region 212 having an outer diameter $d_2$ with a cylindrical shelf region 210 at the proximal end of the intermediate diametered region 212 and a diamond-shaped shelf region 218 at a distal end, the relationship between outer 15 diameters being $d<d_2<d_1$, a non-spherical expanded region 220 with neck region 224 which reassumes an expanded circular configuration at a distal end 226 of the neck region, said distal end region having an outer diameter $d_3$, said diameter being larger than $d_1$, and which is essentially maintained in bent region 228 terminating at circular shelf 230, leading to connecting segment 232 of outer diameter $d_2$ which expands from circular shelf 234 to expanded diametered region 236 having an outer diameter $d_1$ and bent region 238 terminating at circular shelf 240 into a series of cascading segments 242,246 separated by circular shelf 244, said segments having an outer diameter of $d_2$ and d respectively. As seen from a combination of FIGS. 2–3, it is possible to impart three-dimensional characteristics to be formed tube by controlling the angles utilized in the bent regions of the tube. The angles β,β' shown in the bent regions of the tube shown in regions 238,228 (essentially 90°) are defined within a two-dimensional plan (X-Y). However, using this defined two dimensional plane, the third angle, shown in region 214, contains an out-of-plane component (Z direction) in addition to the angle within the X-Y plane defined previously. Therefore, as viewed in FIG. 1, this bent region would appear to have a 90° bend, just as previously described for regions 228 and 238. However, as viewed along line 2—2 and as shown in FIG. 2, the part has a Z-component to the angularity, and as best viewed along line 3—3 and shown in FIG. 3. It is an aspect of this invention to have at least one angle, α,β,β', in the connector, the angle being formed between the longitudinal axes of the two segments of the connector and said angle ranging between the values of $0°>α,β,β'<180°$ or $180°>α,β, β'≦360°$, the value of 180° representing no angularity, i.e., a straight segment with no bond and a value of 360°, the value of 180° representing an angle which bends back upon itself, thereby forming parallel lines and thereby essentially reversing the direction of the flow of the gas or liquid through the connector, as more fully shown in FIGS. 4–6. More preferably, the angle will range between the values of $10°>α,β,β'<170°$ or $190°>α,β,β'≦360°$, and most preferably, the angle will range between the values of $40°>α,β,β'<140°$ or $220°>α,β,β'≦360°$.

This connector 200 is formed by taking an extruded tube of initial outer diameter d and selectively heating at least a portion of the tube essentially defined for this example, as the region of the tube from proximal end 202 to distal end 248 using an external source of heat, to a temperature at which the polymer begins to become formable, followed by positioning of this heated region of the tube into a split mold having variously configured cavities and bends therein. The various cavities within the mold will be suitably dimensioned so as to permit expansion of the initially outer diametered tube d of proximal region 204 to expand to outer diametered regions 208,236 of outer diameter $d_1$, one of said regions 236 additionally incorporating bend region 238, and to expand to a outer diametered regions 212,216,232,242 of outer diameter $d_2$, one of said regions additionally incorporating bend region 214, said bends of which are imparted to the tube from the formability of the polymer, thereby permitting the tube to be manually bent during its insertion into these parts of the mold cavity.

After insertion of the formable tube into one half of the split mold, the mold is subsequently closed and distal region 246 pinched off typically by closure of the mold, although it is recognized that another sealing means could be employed, e.g., insertion of a plug into the distal region of the profile, thereby sealing distal end 248 of the tube and creating a closed interior channel within tube 200. A source of compressed gas (e.g., air, nitrogen, etc.) is then attached by an adapter (not shown) to proximal end 202 and gas pressure turned on to a pressure at which radial expansion of the formable tube occurs, expanding the walls of the tube to conform to the interior shape of the mold cavities. In light of this radial expansion, it is critical that an initial thickness of the tube 200 be sufficient such that during the radial expansion process with associated wall thinning, the thickness of the tube in the expanded segments will still be sufficient to withstand the operating environment intended for the tube. While the step of heating has been indicated to essentially encompass the entire tube, this is but one way to achieve the desired result. It is equally possible, although more time-consuming, to selectively heat only small regions of the tube to achieve the same net result, in a sequential manner.

In another embodiment of this invention, and one which is particularly suited to the application of this technology, is shown in FIGS. 5–6. In these figures, an overmolded plumbing connector is shown which uses a thicker walled extruded tube as the initial starting material for use in association with blow molding and overmolding technologies. The thicker walled extruded tube 250 shown in FIG. 4 having an initial wall thickness t is required in that during the blow molding aspects of the processing, the polymeric material used in the radial expansion will be accommodated by a decrease in the wall thickness to t', wherein t>t' The polymeric tube 250 shown in FIG. 4 will also have a channel centrally disposed therethrough 282, said channel having an inlet 252 and an essentially cylindrical wall thereabout the inlet, and an outlet 270 with an associated essentially cylindrical wall thereabout 268.

In processing the tube 250 shown in FIG.4 into a plumbing connector shown in FIG. 6, the tube will be required to be heated to a temperature at which the tube becomes formable. This temperature will be dependent upon the polymer used in the tube, and the fillers and other additives present in the polymer, said temperature being easily determinable to those skilled in the art. At a temperature when the tube is formable, the tube is positioned within a split mold having a plurality of cavities and bends disposed therein, said cavities being suitably dimensioned so as to permit radial expansion of at least a portion of the cylindrical walls 256 of the tube to expand to a larger external diameter, such expansion being effected by a corresponding decrease in the wall thickness of the tube from its initial value of t to t' and forming an expanded interior tube chamber 280. As seen in FIG. 5, the tube has been bent at segment 258 to a radius r, thereby forming a J-shaped 260 connector with a plurality of cascading smaller chambers 278,276 delineated by cylindrical regions 264,268 and cylindrical shelves 262,266 respectively. When the split mold is closed, a region of flash 274 is typically formed about a distal end 272 of the tube as a portion of the tube is pinched off prior to the blow molding processing. Subsequent to the closing of the mold, an adapter (not shown) is affixed to the inlet 252 at the proximal end of the tube and a compressed gas allowed to enter into the tube channel 282 with radial expansion of the cylindrical walls to form expanded interior tube chamber 280.

After formation of the J-shaped connector, with cooling and removal from the mold, the connector is typically cut at its proximal end either through chamber 282 or 280 depending on the needs of the application. As shown in FIG. 6, the connector is shown having been cut through chamber 280. Also as seen in the figure, the tube is cut at its distal end through either chamber 276 or chamber 278, once again, the choice being dependent upon the application, flow rates required, design considerations, etc. In the connector shown, the cut was made through chamber 278. As shown in the figure, the post-extrusion processing not only includes blow molding, but also overmolding of various shapes both onto the connector and onto connector ends. An overmolded adapter having a wall thickness of t" over a majority of the connector is shown, defining an overmolded chamber 288 and an overmolded outlet 286. Also shown is an overmolded fastener 290 about an exterior periphery of the connector. As illustrated in FIG. 7, this particular overmolded fastener has a pointed 292 triangular tip 294 with retaining ledge 298 and shelf 296 interposed therebetween. A shaft 300 diverges into a plurality of vertically extending fins 302 and a laterally extending fin 304 for affixing to the connector at rear surface 306.

One of the values in combining extrusion with post-extrusion processing, is that it overcomes various inherent limitations which are present in either technology. By positioning formable extruded tubes into blow molding chambers, it is possible to fabricate parts which have characteristics not easily possible when using blow molding as the sole technology. In the connector shown in FIGS. 5–6, the tight radius r which is shown folding back upon itself, would not be possible to fabricate by using conventional blow molding equipment.

Figure 8:
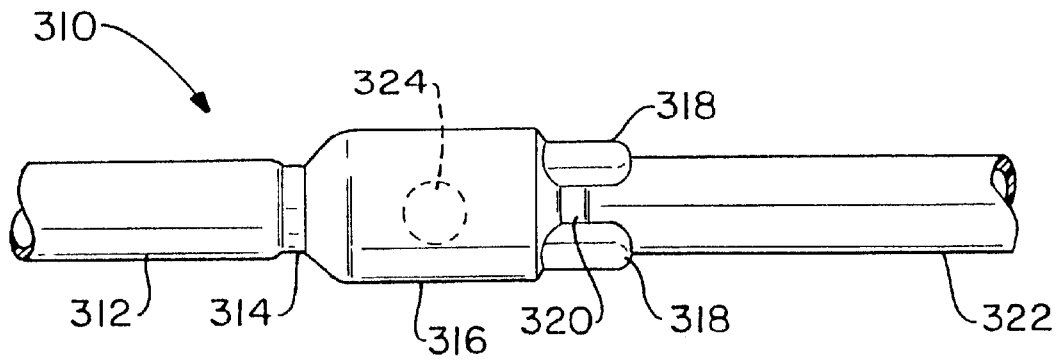
FIG. 8 is an elevational view of an in-line blow molded check valve.

FIG. 8 shows still yet another embodiment of the blow molding technology which operates on the extruded tubular segment. The in-line check valve 310 is shown having a proximal tubular side 312 and a distal tubular side 322, with expanded blow molded segment 316 having a ball 324 captured within the blow molded section interposed therebetween. This expanded blow molded segment has a neck 314 on a proximal side of the check valve and a plurality of ribbed segments 318 on a distal side of the blow molded section, with corresponding number of valleys 320 between each rib 318. With such a tubing connector, essentially one-way directional flow control is achievable. A liquid or gas stream will enter the tube at its proximal end and flow into the expanded blow molded segment, thereby forcing the ball within this expanded segment toward the distal side, resting against the valleys 320 interposed between the ribs 318. Due to the fact that the ball is of a diameter such that it cannot flow past the valleys, but yet not so large so as to block flow through the hollow ribbed segments, the gas or liquid continues though the tube into the distal region 322. However, should the flow pattern be reversed, then the ball 324 is force back toward the proximal end of the tube and seats against the neck of the expanded segment, thereby essentially prohibiting as or liquid flow through the tube.

This in-line check valve is made in a manner similar to that described previously in this blow molding section and essentially will involve heating at least a portion of a non-end region of the tube followed by positioning of the heated portion of the tube into a mold having a cavity designed to impart the geometric configuration of ribs and valleys at the distal end of the expanded region and a restrictive neck at the proximal end of the expanded region, the ball having been inserted into the region which is to be expanded prior to the closing of the mold halves and the application of gas pressure to expand the polymer to completely fill the mold cavities.

Fabrication of a Belled Tubing End

This discussion will focus on the technology used to fabricate at least one belled end in a tubing connector, wherein the thickness of the belled tubing walls has not been compromised, and in some instances, has even been increased. As seen in FIGS. 9–14, the process compromises a top vertically fixed mold 10 and a vertically movable bottom mold 11. The top mold or die 10 includes a central bore 12 and a riser tube 13 secured to the top thereof having an I.D. which is essentially the same as the I.D. of the bore 12. The lower surface of the top mold is provided with a cylindrical projection 14 projecting centrally therefrom. The lower end of the bore is provided with a conical flaring portion 15, the lower end of which is provided with a small radius seen at 16. Radially beyond such radius, the bore is terminated in an axially extending edge 18.

The bottom mold 11 includes a body 20 which may include an annular passage 21 for the circulation of cooling medium therethrough. The body 20 is threadedly connected to rod 22 of a piston-cylinder assembly and adjustably locked thereto by the nut 23. The top of the mold or die 11 is provided with a central recess shown generally at 25 which includes an upper cylindrical portion 26 into which the axial projection 14 of the top mold is designed closely to telescope. The lower end of the cylindrical portion is provided with a shoulder 27 separating the belling cavity 28 as shown in FIGS. 9–14 or FIGS. 15–20. The lower circular bell forming cavity is provided with a horizontal circular axially facing end face 29 which is selectively larger in diameter than the diameter of the bore 12. Optionally, and projecting axially from the bottom of the recess 25 is a guide rod 30, the top of which is provided with a pilot nose or pointed portion 31.

In FIG. 9, the top and bottom molds or dies have been brought to an intermediate position relative to each other in that the bottom mold 11 has been brought to an intermediate elevated position and the position may be determined by a retractable adjustable stop as seen at 33. In such position, the pilot nose of the guide rod 30 projects into the bore 12 as shown.

Referring to FIG. 10, it will be seen that the top of the guide tube 13 is provided with a back stop seen at 35 which may be pivoted to the top of the guide tube 13 for swinging movement to and from a position clear of the I.D. of such tube or over the I.D. of such tube.

An extruded plastic tube section, preferably a polyolefin, optionally with at least some degree of crosslinking, preferably less than 50%, more preferably less than 35%, cut to a predetermined length, is now inserted downwardly through the guide tube as seen at 37 to project from the lower end of the top mold 10. The dimensions of the tube O.D. and I.D. are such that the tube will fit snugly in the I.D. of the bore 12 with the I.D. of the tube fitting snugly over the O.D. of the rod 30. It is important that the tube 37 project a predetermined distance below the top mold 10. This predetermined distance can be obtained in several ways. When the operator inserts the tube, the operator can insure that the top of the tube is flush with the top of the guide tube 13 and pivoting the back stop 35 over the top of the tube gages the tube against such back stop. In this manner, the tube length may be gage from the top end to project the predetermined distance noted. Alternative, a gage bar, shown at 40 may be employed to contact the lower end of the tube to obtain the desired projection.

With the molds still in their intermediate position and the tube properly positioned and projecting from the top mold, the projecting end of the tube is now heated as seen in FIG. 11. The heating of the tube may be accomplished in a variety of ways, including electric heaters, hot air and other means known to those of skill in the art, the choice of heating method being at least somewhat dependent upon the degree of heating required and access to various modes of energy at the location of the heating operation. In FIG. 11, two heating blocks 42 and 43 are employed, each provided with electrical heating elements seen at 44 and 45, respectively, to confine the projecting end of the tube 37 therebetween. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures described in this operation (e.g., 600–900° F., for illustrative purposes only, this temperature would be approximately 700° F.±25° F. for a time of between 10–30 seconds in the case of polypropylene, and approximately 700° F.±25° F. for a time between 15–35 seconds for partially crosslinked polyethylene). The key is to balance temperature and dwell time within the heating blocks. It is well within the skill of those in the art to vary the time and/or temperatures noted to achieve the desired degree of "softness" necessary for further processing.

After the desired amount of heat is applied, the heating blocks are removed. Depending upon the polymer and/or time and/or temperatures used, a cooling cycle may be employed before the initiation of the next step. If a bottom gage is employed, the gage 40 is also removed and the retractable step 33 is withdrawn. With the back stop 35 in place, the piston-cylinder assembly of the rod 22 is now further extended as seen in FIG. 12, and the projecting end of the tube seats in the bottom face 29 of the belling cavity 28 and begins to form as seen at 52. As the bottom mold 11 moves upwardly as indicated by the arrows 54 and 55 in FIGS. 12–13, the axial projection 14 of the top mold telescopes with the cylindrical recess 26 of the bottom mold. The bottom mold continues upwardly to the position shown in FIG. 13, forming the tube end as indicated. During such movement, the back stop 35 keeps the tube from moving upwardly with respect to the top mold. The piston-cylinder assembly is fully extended until the edge 18 of the top mold engages the shoulder 27. Such edge will tend to bite off or render easily removable any flash formed between the telescoping surfaces of the molds. Alternatively, a stop or gage ring can be provided as seen at 57 to limit the relative movement of the molds to avoid wear on the edge 18. When the molds are fully together as seen in FIG. 13, a cooling medium may be circulated through the passage 21 as seen at 58. While water is preferred, it will be appreciated that the cooling medium could be many other fluids such as oil or a gas.

After the mold has been cooled for a predetermined time, the piston-cylinder assembly of the rod 22 is fully retracted and the top mold may be indexed horizontally so that the now formed tube may be removed. If any flash appears, it can readily be removed from the tube. While the discussion has focused on the top mold being of unitary construction, it is equally envisioned that a split mold could be employed. In this embodiment, and the piston-cylinder assembly is fully retracted, the split halves of top mold 10 would be opened and the part removed from the top mold in a vertical direction.

After the tube is removed, the top mold remains in alignment with the bottom mold and the stop 33 is returned to its position and the piston-cylinder assembly is extended to bring the molds back to the original FIG. 9 position so that the process may be repeated.

It will be appreciated that the tooling illustrated may be either horizontally or vertically oriented and that the recess configurations may be readily altered to form a belled end of varying configurations. Also, the tube holder 13 can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold 10 may be termed the female mold while the moving mold 11 with the guide rod projecting therefrom and holding the I.D. of the tube may be termed the male mold or die.

That resultant belled end of the product of the process described in FIGS. 9–13 is seen in FIG. 14. The plastic tube thus formed includes an integrally formed belled end into which a suitably dimensioned copper fitting for example, could be inserted. The plastic tube thus formed, includes an integrally formed belled surface 60 extending from the end face 61 of the tube to conical neck 65. The end face 61 of the tube has both a larger I.D. and O.D. than the remainder of the tube, but the thickness of all portions of the tube are the same.

As shown in FIG. 15, alternative mold designs are envisioned equally applicable to the process described previously. In discussing this alternative embodiment, like part numbers are referred to using the same reference numerals described previously. Similar, but modified parts are designated by the inclusion of a prime (') after the reference numeral. The device includes a top vertically moveable two-piece horizontally operating clamping die 9, a center vertically-fixed two-piece horizontally operating mold 10' and a vertically moveable bottom mold 11'. The clamping die 9 includes a central bore, the diameter of which is equal to a diameter sufficiently smaller than the diameter of the tube to be belled so as to cause a clamping effect on the tube when the clamp die 9 is closed.

The center vertically-fixed two-piece horizontally operating mold 10' includes a central bore of the same diameter as the tube to be belled. The lower end of the bore is provided with a conical flaring portion 15', the lower end of which is a diameter and length equal to the outside diameter and length of the belled end of the tube.

The bottom mold 11' includes a body 20' which may include an annular passage 21' for the circulation of a cooling medium therethrough. The body is threadedly connected to rod 22 of a piston-cylinder assembly and adjustably locked thereto by nut 23. The bottom mold or die 11' is provided with a central recess shown generally at 25' into which the axial projection 14' of the top mold 10' is designed closely to telescope. Projecting from the bottom of the recess 25' is rod 30', the diameter of the rod at the bottom of the recess of equal diameter to the I.D. of the belled end of the tube and maintained for a distance equal to the depth of the tube bell. Rod 30' terminates at top 31' and is radiused to corresponding conical flaring portion 15' at conical segment 32.

In sequenced operation and shown in successive figures, this modified mold and die design is identical in concept, and implementation to that previously detailed and all related discussion is equally applicable to either embodiment. As shown in FIG. 16, plastic 37 is inserted through clamping mold 9 and top mold 10', resting on tube position stop 40. The two halves of the clamping mold 9 are closed thereby holding plastic 37 firm.

In FIG. 17, clamping mold 9 is moved to a position extending the lower end of the plastic 37 into a cavity in heating blocks 42. The split halves of center mold 10' are closed about the circumference of plastic body 37 during the heating cycle to provide stability to the tube during the heating cycle.

Figure 19:
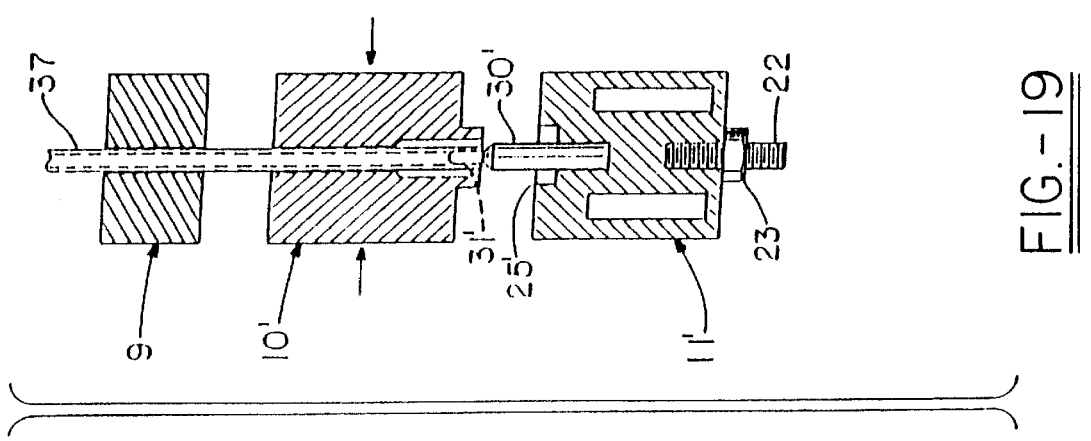
FIG. 19 is a view similar to FIGS. 15–18 showing the dies being brought together.
Figure 18:
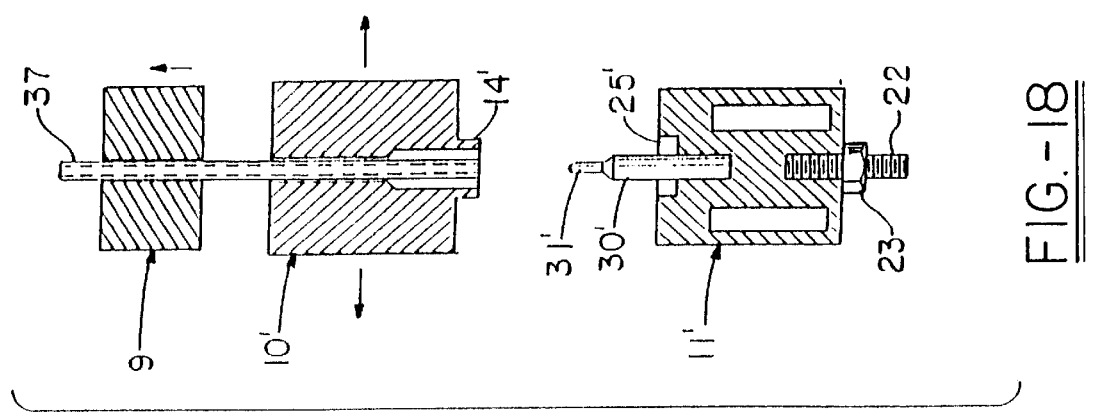
FIG. 18 is a view similar to FIGS. 15–17 showing the clamping die retracting the projecting tubing portion back into the middle die for subsequent belling.

With the heating cycle completed, center mold 10' is opened and clamping mold 9 returned to its original disengaged position. The heated end of plastic 37 is now positioned in the belled cavity of center mold 10' as shown in FIG. 18. In FIG. 19, the center mold 10' has been closed about plastic 37 and bottom mold 11' moved upward with the pilot nose 31' of guide rod 30' penetrating the heated end of the tube.

Figure 20:
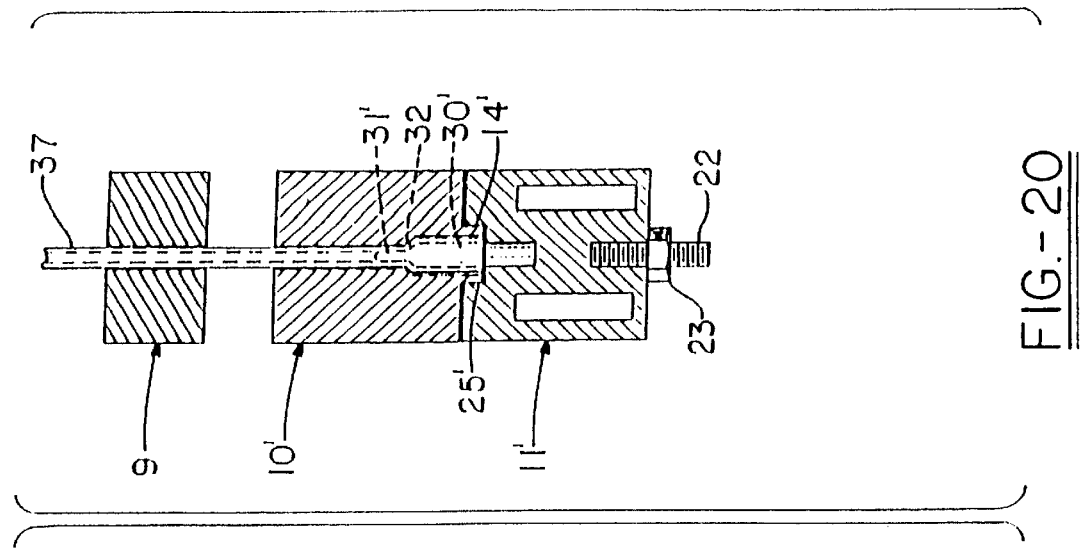
FIG. 20 is a view similar to FIGS. 15–19 showing the dies closed.

In FIG. 20, bottom mold 11' is completely extended, forcing the heated plastic into the cavity created at the connection center mold 10' and bottom mold 11'. After a sufficient period of cooling, all molds are returned to their original positions and the belled tube is then removed from the molds.

Figure 21:
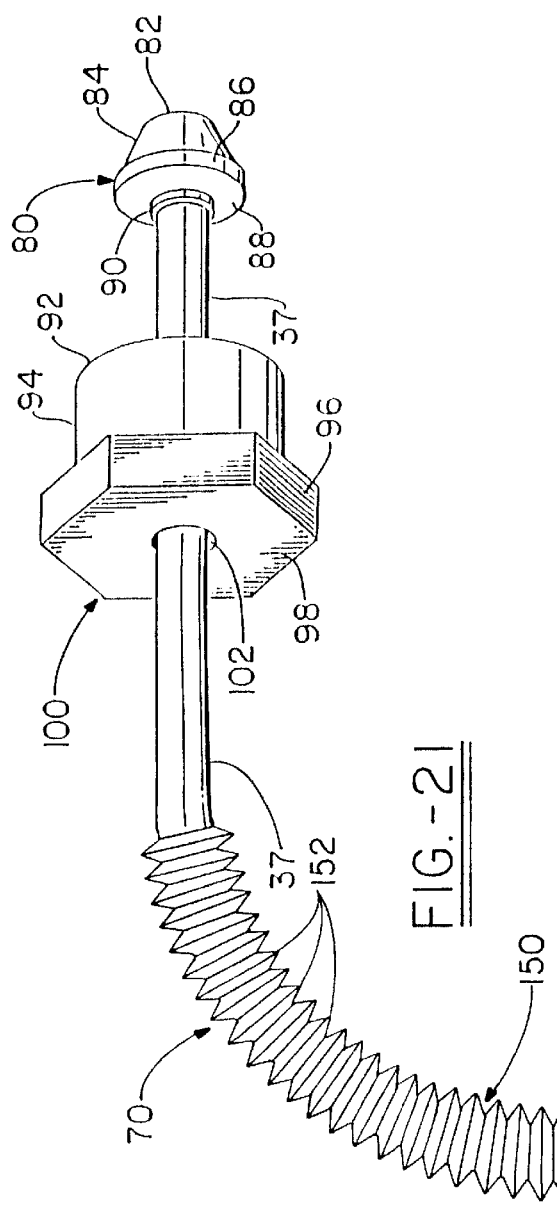
FIG. 21 is a perspective view showing a non-linear orientation of the male and female segments of a section of tubing wherein the male segment is an integrally molded bulb and sealing surface and the female segment is shown belled to a larger diameter, the thickness of the tubing being constant throughout, with internally threaded nut shown slightly below the male segment, the bending being effected by the ribbed middle segment.
Figure 22:
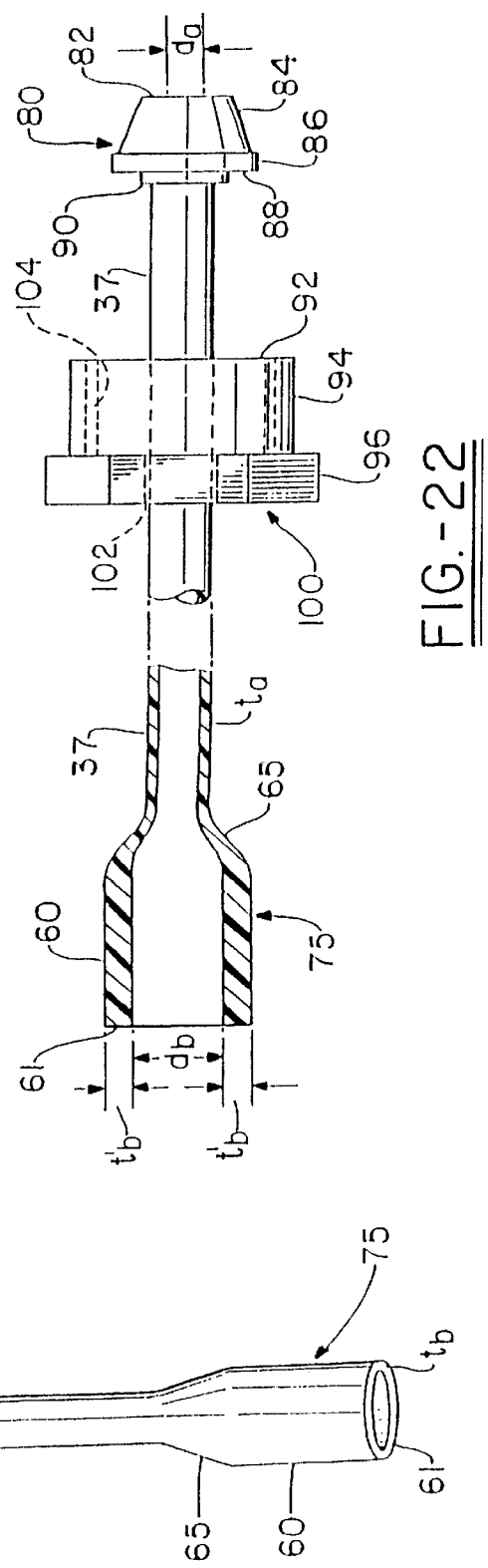
FIG. 22 is a partial sectional view of the tubing shown in FIG. 21 illustrating an increased thickness of the tubing in the belled region.

While a plumbing connector wall thickness $t_b$ throughout, is shown in FIG. 21, the application is not necessarily limited to such. As shown in FIG. 22, it is possible to fabricate plumbing connectors 70 wherein the wall thickness $t_b'$, is greater than that of the mid-portion of tube 37. In other words $t_b' > t_b$. Such a configuration is made by increasing the thickness of the die cavity containing circular bell forming cavity 28. As discussed previously in relation to a constant wall thickness $t_b$, thickness $t_b'$ will require that tube 37 project an even longer distance below top mold 10 than used when thickness $t_b$ is desired. This is necessary such that subsequent to the softening of the projecting end of tube 37 via the action of heating blocks 42 and 43, or other heating means, and the dies have been brought together, the larger die void, i.e., bell forming cavity 28 will be filed with polymer.

Fabrication of a Sealing Surface

This discussion will focus on the technology used to fabricate at least one sealing surface end in a tubing connector wherein the sealing surface is integral with the tubing. In FIG. 24, the top and bottom molds or dies have been brought to an intermediate position relative to each other in that the bottom mold 11a has been brought to an intermediate elevated position and the position may be determined by a retractable adjustable stop as seen at 33. In such position, the pilot nose of the guide rod 30 projects into the bore 12 as shown.

Referring to FIG. 25, it will be seen that the top of the guide tube 13 is provided with a back stop seen at 35 which may be pivoted to the top of the guide tube 13 for swinging movement to and from a position clear of the I.D. of such tube or over the I.D. of such tube.

An extruded polyolefin plastic tube section, optionally with a degree of crosslinking, preferably less than 50%, more preferably less than 35%, cut to a predetermined length, is now inserted downwardly through the guide tube as seen at 37 to project from the lower end of the top mold 10. The dimensions of the tube O.D. and I.D. are such that the tube will fit snugly in the I.D. of the bore 12 with the I.D. of the tube fitting snugly over the O.D. of the rod 30. It is important that the tube 37 project a predetermined distance below the top mold 10. This predetermined distance can be obtained in several ways. When the operator inserts the tube, the operator can insure that the top of the tube is flush with the top of the guide tube 13 and pivoting the back stop 35 over the top of the tube gages the tube against such back stop. In this manner, the tube length may be gauged from the top end to project the predetermined distance noted. Alternatively, a gage bar, shown at 40 may be employed to contact the lower end of the tube to obtain the desired projection.

With the molds still in their intermediate position and the tube properly positioned and projecting from the top mold, the projecting end of the tube is now heated as seen in FIG. 26. The heating of the tube may be accomplished in a variety of ways. In FIG. 26, two heating blocks 42 and 43 are employed, each provided with electrical heating elements seen at 44 and 45, respectively, to confine the projecting end of the tube 37 therebetween. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures described in this operation e.g., 600–900° F., for illustrative purposes only, this temperature would be approximately 700° F.±25° F. for a time of between 10–30 seconds in the case of polypropylene, and approximately 700° F.±25° F. for a time between 15–35 seconds for crosslinked polyethylene. The key is to balance temperature and dwell time within the heating blocks. It is well within the skill of those in the art to vary the time and/or temperatures noted to achieve the desired degree of "softness" necessary for further processing.

After the desired amount of heat is applied, the heating blocks are removed. Depending upon the polymer and/or time and/or temperatures used, a cooling cycle may be employed before the initiation of the next step. If a bottom gage is employed, the gage 40 is also removed and the retractable step 33 is withdrawn. With the back stop 35 in place, the piston-cylinder assembly of the rod 22 is now further extended as seen in FIG. 27, and the projecting end of the tube seats in the bottom face 29a of the bulb forming cavity 28a and begins to form as seen at 53. As the bottom mold 11a moves upwardly as indicated by the arrows 54 and 55 in FIGS. 27–28, respectively, the axial projection 14 of the top mold telescopes within the cylindrical recess 26 of the bottom mold.

The bottom mold continues upwardly to the position shown in FIG. 28 forming the tube end as indicated. During such movement, the back stop 35 keeps the tube from moving upwardly with respect to the top mold. The piston-cylinder assembly is fully extended until the edge 18 of the top mold engages the shoulder 27. Such edge will tend to bite off or render easily removable any flash formed between the telescoping surfaces of the molds. Alternatively, a stop or gage ring can be provided as seen at 57 to limit the relative movement of the molds to avoid wear on the edge 18. When the molds are fully together as seen in FIG. 28, a cooling medium may be circulated through the passage 21 as seen at 58. While water is preferred, it will be appreciated that the cooling medium could be many other fluids such as oil or a gas.

After the mold has been cooled for a predetermined time, the piston-cylinder assembly of the rod 22 is fully retracted and the top mold may be indexed horizontally so that the now formed tube may be removed. If any flash appears, it can readily be removed from the tube. While the discussion has focused on the top mold being of unitary construction, it is equally envisioned that a split mold could be employed. In this embodiment, and the piston-cylinder assembly is fully retracted, the split halves of top mold 10 would be opened and the part removed from the top mold in a vertical direction.

After the tube is removed, the top mold remains in alignment with the bottom mold and the stop 33 is returned to its position and the piston-cylinder assembly is extended to bring the molds back to the original FIG. 24 position so that the process may be repeated.

It will be appreciated that the tooling illustrated may be either horizontally or vertically oriented and that the recess configurations may be readily altered to form a sealing surface e.g., radiused, of varying configurations. Also the tube holder 13 can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold 10 may be termed the female mold while the moving mold 11a with the guide rod projecting therefrom and holding the I.D. of the tube may be termed the male mold or die.

Depending on the equipment available, the end application requirements, cost factors, etc., the starting tubing material will be different. For many applications, polyolefins, e.g., polypropylene, polyethylene, etc., are preferred. Depending on the application, the polyethylene may be crosslinked, or partially crosslinked. The crosslinking of the polyethylene may be effected in two stages, with an initial degree of crosslinking being less than 50%, preferably less than 35%, followed by post-extrusion processing, and ultimately a second degree of crosslinking raising the final degree of crosslinking to at least 60% or higher, often to 85%. Cost usually decides which crosslinking method needs to be used to provide a given quality of tubing. The benefit of crosslinking the polyethylene subsequent to the fabrication steps described in the application is that a chemical and/or thermal material bond is formed during the end-forming compression molding processes, resulting in a stronger product. However, there may be applications where this type of end-forming is not essential, thereby permitting the use of previously crosslinked material during the fabrication procedure. Previously crosslinked material has a much better hot melt strength since the crosslinking gives it more structure, and making forming easier. However, the crosslinked material will not chemically bond to itself even when heated to the clear state. This does mean that the material in the formed ends is not completely sealed upon itself, but molded in place with pressure.

Crosslinking can of course, be accomplished in many different ways. Crosslinking can be performed during the extrusion process, e.g., by Engel process, or post-extrusion, e.g., by a silane process or a peroxide process or combinations thereof wherein some crosslinking occurs during the extrusion step and is completed in a hot bath post-extrusion step. Each process has a crosslinking catalyst that causes the polymer to crosslink when certain temperature and pressure are used. One additional way to crosslink is to use radiation. In this method, extruded tubes are passed under a radiation unit and the exposure causes crosslinking. It usually is more economical to radiate straight tubes since the economics revolve around how many parts will fit on a cart that rolls under the beam. However, this does not represent the only embodiment contemplated within the invention. It is envisioned that under some circumstances, it would be appropriate to crosslink the final product. While the sequencing of the above mentioned processing steps is generally not critical, certain aspects do need to be performed in sequence, e.g., the belling and flaring sequences discussed previously in this application. Depending upon the physical strength and integrity of the final product, the steps of crosslinking, belling, and/or flaring can be effected in any sequence, the only limitation being that the insertion of a nut must be effected prior to the completion of both the belling an flaring fabrication processing. A similar limitation would also be present when the tubing work piece is to have two sealing surfaces on opposed ends. The insertion of the nut would need to precede the fabrication of the second sealing end.

FIG. 21 illustrates another embodiment of a completed connection 70 comprising a unitary molded end cap 80, nut 100, and belled end 75. The length of connector 70 is of any length, and configuration. It may be straight or contain a myriad of bends and twists. What is critical however, is that subsequent to the formation of the end cap 80, the nut 100 is positioned onto the connector with the open face 92 of nut 100 facing toward end cap 80. It is not possible to inset nut 100 subsequent to the belling step described previously.

Unitary molded end cap 80 comprises a belled sealing surface 84 extending from the end fact 82 of the tube to radially extending flange 86. The sealing surface 84 maybe radiused as indicated or it may be conical. The end face 82 of the tube has a slightly larger O.D. than the remainder of the tube so that the wall of the tube at the sealing surface is substantially enlarged throughout its length. The sealing surface terminates in the flange 86 which includes a stop face 85 adjacent the sealing surface and a shoulder 88 on the opposite side. From the shoulder to the O.D. of the tube, there is provided a fillet 90 which joins the flange spaced from the peripheral edge thereof with a collar 90 as shown in FIG. 21.

Nut 100, which is inserted prior to the belling step, and after the formation of unitary molded end cap 80, is positioned onto connector 70 of diameter $d_a$ through nut opening 102 which is of larger diameter $d_a$, but of smaller diameter than shoulder 86, with open face 92 positioned toward end cap 80. Nut 100 contains a threaded circular bore 104 of predetermined height 94 which is used to sealingly engage a mating threaded receiver (not shown). As nut 100 is tightened by a plurality of parallel-spaced ridges 96, end cap 80 is brought into leak-proof engagement with the threaded receiver by the top surface 98 of nut 100, through its engagement onto shoulder 88 of end cap 80.

As shown in FIG. 21, the plumbing connector 70 need not be a linear configuration along a longitudinal axis of the connector. In fact, non-linear configurations are well-within the scope of the invention. Such bends within the connector can be (1) permanent, the result of post fabrication techniques, such as mild, fairly localized heating o a softening point of the material, followed by bending and molding within a fixture that will hold the desired angle and radius, followed by cooling, and other processes which are known-in-the-art; or (2) non-permanent, e.g., by fabrication (blow molding) of a ribbed segment within the tube as shown at 150 wherein bendability of the connector is achieved by the plurality of ribs 152 within that segment of the connector.

While the plumbing connector wall thickness $t_b$, has been shown to be the same throughout, the application is not necessarily limited to such. As shown in FIG. 22, it is possible to fabricate plumbing connector wherein the wall thickness $t_b'$, is greater than that of the mid-portion of tube 37. In other words, $t_b'>t_b$. Such a configuration is made by increasing the thickness of the die cavity containing bell forming cavity 28. As discussed previously in relation to a constant wall thickness $t_b$, thickness $t_b'$ will require that tube 37 project an even longer distance below top mold 10 than used when thickness t is desired. This is necessary such that subsequent to the softening of the projecting end of tube 37 via the action of heating blocks 42 and 43, or other heating means, and the dies have been brought together, the large die void, i.e., bulb forming cavity 28 will be filled with polymer.

Figure 23:
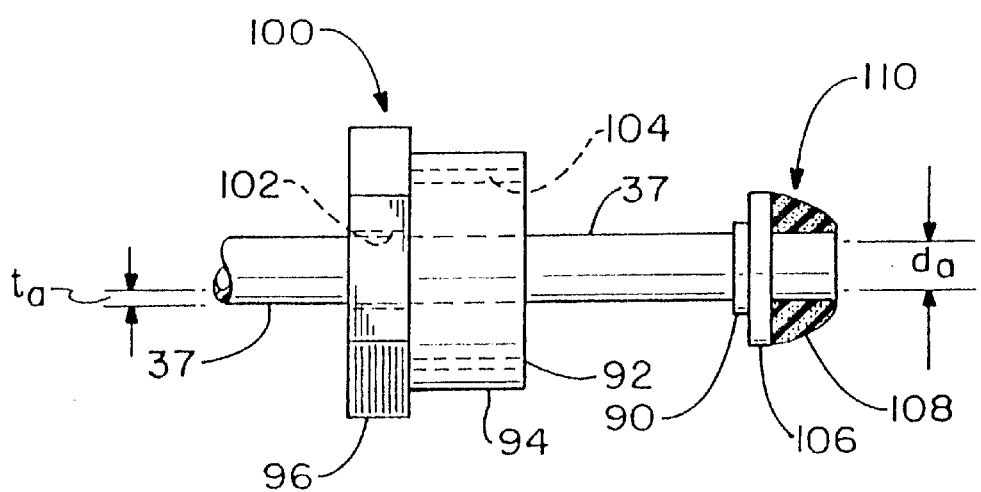
FIG. 23 is an elevational view in partial cross-section showing the male segment of a section of tubing wherein the male segment is an integrally molded ledge with a soft nose cone sealing surface.

While unitary molded end cab 80 has been previously prepared in accordance with the mold design shown in U.S. Pat. No. 4,316,870, U.S. Pat. No. 4,446,084 and U.S. Pat. No. 4,525,136, it is not limited in shape to such. In some instances, i.e., an alternative embodiment, it is preferable to switch to a different mold design for the molded end cap, such as to produce a tubing end 110 as shown in FIG. 23, wherein a constant diametered $d_a$ tube is shown having a tubing wall thickness $t_a$ and a nose cone shelf 106 projecting essentially normal to the longitudinal axis of the tubing as shown. The sealing bulb 108, shown in cross-section, is a separate insert which seats itself onto one side of the nose cone shelf 106 and is typically made of a rubber polymer (e.g., EPDM, neoprene, TPR, TPE, etc.) which is softer than crosslinked polyethylene.

Fabrication of Overmolded Segment

Leak-proof connectors are used throughout the world in a variety of applications. In general, these connectors consist of fairly complicated arrangements of metallic and/or polymeric components typically using a rubber washer for leak-proof engagement. However, there are many applications wherein it is desirable to minimize the complexity of the part and/or to minimize the number of components in the part, particularly where it is not readily possible to replace components within the part. It is further highly desirable to produce parts which mimic parts which are essentially of one-piece construction, yet which still retain the benefits of the more complex arrangement. Overmolding is one process which is gaining in acceptance within the industry for effecting such purposes.

When overmolding, it is known to have metallic cores which retract into the center of the molded product. Such a technique however has been limited in the past to non-ribbed configurations in that it is typically very difficult, if not impossible, to remove a ribbed part from a ribbed metallic core without damage to the part. Therefore ribbed metallic core inserts have not been used. However, ribbed configurations are however highly desirable in that part alignment issues are minimized due to the inherent flexibility of the ribbed configuration, thereby permitting less rigorous tolerances in part positioning.

Figure 29:
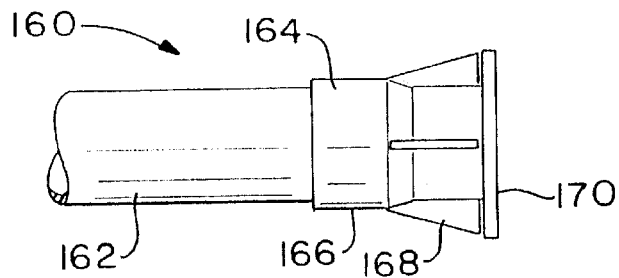
FIG. 29 is an elevational view, showing a non-ribbed overmolded connector.

As illustrated in FIG. 29, a non-ribbed connector is shown. This connector is comprised of a hollow plastic tube 162 and an overmolded connector 164. The overmolded connector has a portion 166 which extends over the plastic tube 162 and a portion which projects axially from the end of the tube 172. This axially extending portion has plurality of fins 168 and an integrally molded washer 170 for engagement with a mating receptacle (not shown). This connector is formed by an overmolding process using a non-collapsible metallic core, from which the connector is removed by the application of an axial force which slides the connector over the core, thereby effecting the removal from the core. This process is effective for non-ribbed overmolded connectors. These parts also require tight alignment tolerances in that the plastic tubes 162 are generally made of a rigid plastic, and the overmolded polymer, while generally flexible, is still limited in its alignment due to the inherent rigidity of the tube to which it is affixed.

Figure 31:
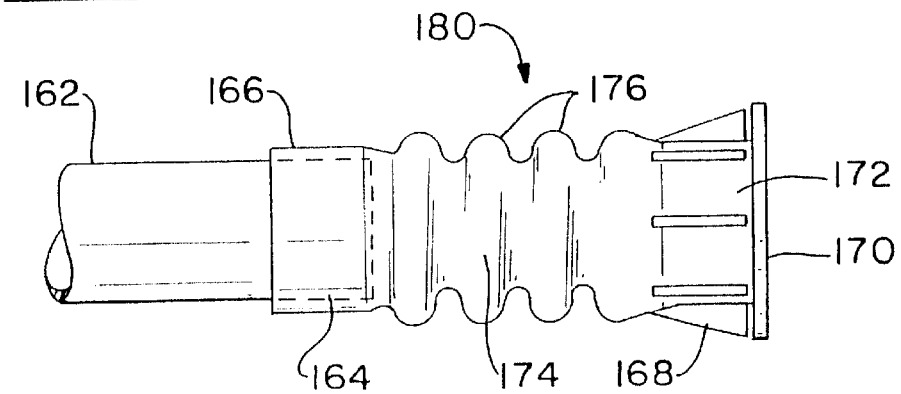
FIG. 31 is an elevational view, showing the ribbed overmolded connector.

As illustrated in FIG. 31, a ribbed connector 180, is shown, the connector also having a rigid plastic rube 162 and a ribbed overmolded connector 174. Through the flexibility of the overmolded connector due to the presence of a plurality of ribs 176, the alignment issues are minimized through the inherent flexibility of the ribbed section of the connector, thereby permitting effective leak-proof engagement even when the connector and mating receptacle are not in vertical or horizontal alignment.

Figure 30:
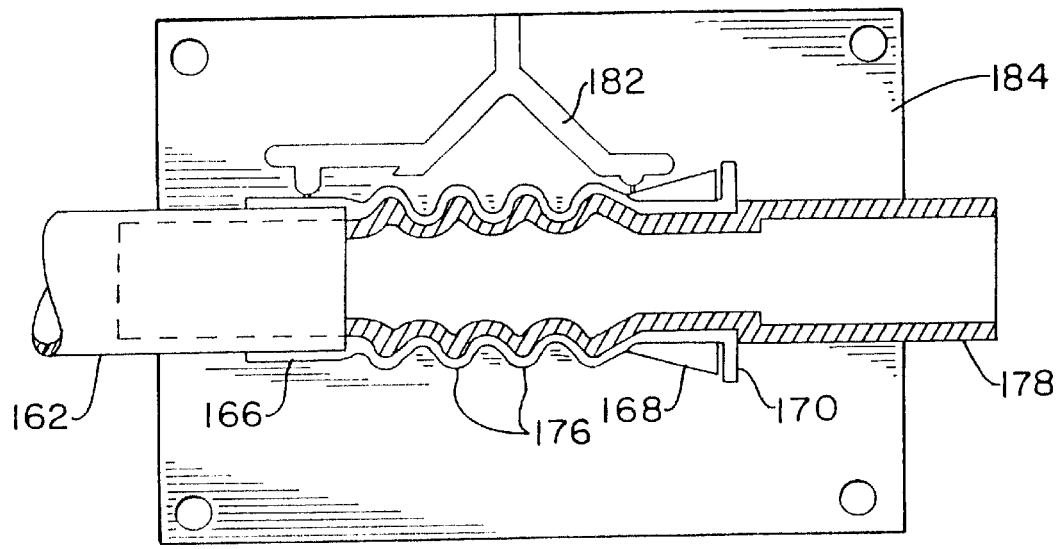
FIG. 30 is a plan view, in partial cross-section, showing the ribbed non-collapsible metallic core with plastic tube inserted partially thereunto, as well as the ribbed overmolded connector.

In the overmolding process which is used to manufacture the ribbed overmolded connector, a split die is used, wherein only one-half 184 of the split die is shown in FIG. 30. This die will have an internal cavity which is adapted to closely fit about the external diameter of the rigid plastic tube 162 at one end and which is adapted to closely fit about the external diameter of a metallic ribbed core insert 178 at an opposed end. The metallic ribbed core insert is also dimensioned so as to permit sliding engagement with the internal diameter of the plastic tube. The die cavity is dimensioned so as to have an internal void into which the overmolded polymer flows from a runner system 182 which feeds the molten polymer into the void space within the split die.

Injection molding of thermoplastics is a process by which plastic is melted and injected into a mold cavity void, defined in this instance as the void volume between the mold core body and the mold cavity. Once the melted plastic is in the mold, it cools to a shape that reflects the form of the cavity and core. The resulting part is a finished part needing no other work before assembly into or use as a finished part. The injection molding machine has at least one and sometimes, two basic components: an injection unit to melt and transfer the plastic into the mold, and optionally, a clamp to hold the mold shut against injection pressures and for parts removal. The injection unit melts the plastic before it is injected into the mold, then injects the melt with controlled pressure and rate into the mold.

Important factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

If the polymer is a thermoset, injection molding uses a screw or a plunger to feed the polymer through a heated barrel to decrease its viscosity, followed by injection into a heated mold. Once the material fills the mold, it is held under pressure while chemical crosslinking occurs to make the polymer hard. The cured part is then ejected from the mold while at the elevated temperature and cannot be reformed or remelted.

When thermoplastics are heated in an injection press, they soften and as pressure is applied, flow from the nozzle of the press into an injection mold. The mold has cavities that, when filled with the thermoplastic material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

However, the removal of ribbed overmolded parts has been almost impossible due to the requirement of a very significant amount of physical pressure required to be exerted in the axial direction in order to overcome the lateral resilient forces of the overmolded polymer as the part moves over the ribbed sections of the metallic core insert. In the practice of the current invention, the overmolded part is removed from the mold and the ribbed metallic core still held in place by the overmolded polymer. At an opposed end to the ribbed overmolded connector, a sealing means, e.g., a stopper (e.g., teflon), and a pressurizing means, e.g., source of compressed gas, is inserted into the tube and compressed air is introduced into the tube thereby increasing the internal gas pressure within the tube. As the pressure continues to build inside the tube, it begins to radially expand the polymer such that the smallest internal diameter of the overmolded rib portion is at least as great as the largest outer diameter of the ribbed metallic core, thereby permitting a much lower degree of axial force to remove the part from the ribbed metallic core insert. In one embodiment of this invention, the sealing means and pressurizing means are combined into a part which effects the functions of both.

The amount of actual pressure necessary to effect the above polymer expansion is dependent upon part geometry and materials used. On average, between 20 psig to 100 psig will be effective in this application. The sealing means is often a hand-inserted tapered plastic plug which is held in place by axial pressure exerted by an operator.

While the precise composition of the plastic connector and overmolded polymer are not required to be of any specified polymer, in general, there are several guidelines which are applicable in the practice of this invention. It is of course, recognized that the precise operating conditions utilized in the overmolding process are well-known in the art and are specific to each injection molded polymer. It is well within the skill of the art to determine the applicable conditions which will result in the appropriate overmolded polymer and plastic conduit. The degree of flexibility of the plastic conduit is not of particular relevant for this invention. The plastic conduit can be a thermoplastic or a thermoset. The key is that the overmolded polymer must be capable of forming a leak-proof bond, either chemical or physical, with the plastic of the conduit.

In the practice of this invention, illustrative and non-limiting examples of the polymers which may be used in various combinations to form the plastic conduit as well as polymers which may be used in the overmolding process would include: polyacetals, typically highly crystalline linear thermoplastic polymers of oxymethylene units; poly (meth)acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from the aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30

Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

The combination of the above polymers must satisfy at least two simultaneous conditions. First, the plastic conduit must not soften and begin melt flow to the point where it looses structural integrity and second, the overmolded polymer must be capable of forming an essentially leak-proof interface with the plastic conduit, preferably through either a chemical and/or physical bond between the underlying plastic and the overmolded plastic. One of the keys is the recognition that the plastic conduit must be capable of maintaining structural integrity during the overmolding conditions during which the overmolded polymer is in melt flow.

While using polymer compositions which have differing softening points is one way to achieve the above objective, there are alternatives, one of which would include the use of two compositions which have the same softening point, but which are of different thickness. Through manipulation of the time, temperature and pressure conditions experienced during the molding operation, the plastic conduit would not experience melt flow, even though it had a similar softening point or range. It is also possible that through the incorporation of various additives in the polymeric compositions, e.g., glass fibers, heat stabilizers, anti-oxidants, plasticizers, etc., the softening temperatures of the polymers may be controlled.

In a preferred embodiment of the invention, the composition of the overmolded polymer will be such that it will be capable of at least some melt fusion with the composition of the plastic conduit, thereby maximizing the leak-proof characteristics of the interface between the plastic conduit and overmolded plastic. There are several means by which this may be effected. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit and the interior region of the overmolded polymer. Another manner in which to state this would be to indicate that at least a portion of the polymer compositions of the plastic conduit and the overmolded polymer are miscible.

In yet another embodiment, composites of rubber/thermoplastic blends are useful in adhering to thermoplastic materials used in the plastic conduit. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic conduit. In this manner, the cohesion at the interface between these two materials is generally higher than the tensile strength of each of the two materials. The quantity of vulcanizable elastomer may be from 20 to 90% by weight of the vulcanizable elastomer block copolymer combination. This block copolymer compromises a polyether or amorphous polyester block as the flexible elastomeric block of the thermoplastic elastomer while polyamide, polyester or polyurethane semicrystalline blocks for the rigid elastomeric block of the thermoplastic elastomer. In this approach, it is postulated, without being held to any one theory of operation or mechanism, that the leak-proof aspect of this linkage utilizes a phenomenon typically used in the formation of moisture-proof electrical connections, i.e., dynamic vulcanization shrink wrap. In this manner, the overmolded polymer is formed having internally latent stresses which upon the application of heat, permit the relaxation of the stresses with resulting contraction of various polymeric strands within the composition during cooling.

In one specific embodiment of this invention which meets the above criteria, the plastic conduit will be polypropylene and the overmolded polymer is SANTOPRENE® thermoplastic elastomer by Advanced Elastomer Systems having a Shore A durometer of approximately 73. In this matter, due to the fact that the SANTOPRENE® polymer is an ethylene-propylene copolymer, the melt fusion of at least a portion of the polypropylene arms with at least the propylene portion of the SANTOPRENE® will be effected. While a specific Shore A durometer is provided, the invention is not limited to any such value, and in fact, the Shore A durometer will range form approximately 45 to 85, more preferably, from 55 to 65.

Discussion

In this invention, aspects of compression molding and blow molding are combined in a manner which is not achievable by using either technique alone. By starting with an extruded part, cut to a predefined length, it is possible utilize post-extrusion processing encompassing compression molding, blow molding and overmolding techniques on the extrudate, imparting at least one non-coaxial bend into the extruded part, and often at least two bends, optionally with each bend being out-of-plane with respect to the other, to cost-effectively fabricate complex parts and shapes.

The use of the extrudates as the starting material permits high processing speeds, with 100 feet per minute being easily achievable, in comparison to 10 feet per minute typically achievable with blow molding equipment. From a manufacturing standpoint, it is possible to easily minimize scrap, in that it is possible to check and inspect all tubes before processing them into various shapes and configurations. This is not possible with blow molding operations, where only the final product is viewed. Depending on the physical arrangement of the manufacturing facility, it may be possible to capitalize on latent heat in the extruded tube profiles, thereby minimizing subsequent reheating of the tubes prior to insertion into the split molds used to blow mold various parts of the extruded tubular profile. When using this processing methodology, cycle times are minimized in that the rotating nature of the blow molding machinery is eliminated, and the heating blocks used in the post-extrusion heating can be maintained at temperature throughout.

One of the aspects of this invention is that extruded profiles from the extruder must be cooled to below their melt temperature as the profile is exiting through the die of the extruder, so that the profile has at least a degree of structural integrity to permit subsequent manipulative steps on the profile. This generally means cooling to a temperature where the profile is no longer formable, a step which occurs generally subsequent to the sizing step. Therefore, if for example, the melt temperature of the profile as it exits the die is 325–335° F., it generally must be cooled to a temperature of about 150–200° F. before it is positioned within a split mold for subsequent blow molding at temperatures of from 225–275° F., it being recognized that the higher the temperature, the less pressure which will be required during the blow molding step. Of course, it is also recognized that the profile must not be heated to such a temperature so that the blow molding pressures destroy the integrity of the part.

Once again, by using an extruded part as the raw material in the subsequent blow molding operation, it is possible to eliminate the high degree of temperature control required in typical blow molding operations, as well as to eliminate the vertical dropping of the parison, as required when only using blow molding equipment.

What has been described is a manufacturing process which overcomes the inherent limitations of blow molding with the speed of extrusion. Without being limited to one theory of operation, at least one of the keys to the invention is the use of a profile heating means, e.g., heated mold or heated oven, which pre-heats the essentially linear profile to a temperature which is sufficient to permit bending (formability or plasticizing) of the profile, but not melt-processing of the profile. As used in this application, this initial temperature or first temperature is one in which the profile still maintains at least a minimal degree of structural integrity, yet which is still pliable or formable, at least partially plasticized, i.e., to be capable of being inserted into a mold having a nonlinear configuration (plastically bent) without having the profile springing back to its original shape. Phrased alternatively, the modulus of elasticity of the polymeric profile is not so high so as to return to the original essentially linear profile after the externally applied bending force is removed. The polymer is fairly non-adherent, ductile, easily deformable, yet is still below the melt temperature of the polymer. The term second temperature as used in the application means the melt temperature of the polymer, a temperature at which the profile becomes melt-processable or essentially melt processable, a temperature at which upon the application of a modest amount of pressure e.g., less than 50 psig, more preferably less than 25 psig, most preferably less than 5 to 10 psig, the profile can be expanded from a first cross-sectional dimension to a second larger cross-sectional dimension, or a temperature at which the polymer is capable of fusing with itself once again, with at least some pressure. The value of the lower pressure residing in the fact that there is minimal flash at the mold lines. In order to make this process commercially viable, both the initial profile is preheated as well as the profile heating means, e.g., mold. This enables cycle times to be decreased in comparison to typical blow molding operations. Additionally, by preheating the molds, it is possible to avoid the phenomenon of "freezing" which may occur in blow molding operations when the polymeric profile contacts the cold surface of a mold.

The process includes various steps, the first of which involves heating at least a portion of the extruded profile in a preheated profile heating means (e.g., heating mold or oven) to a first temperature at which the essentially linear profile becomes formable or pliable or bendable. The profile still has at least some degree of structural integrity at this point which permits it to be physically manipulated without compressing the profile by the application of external pressure or by the weight of gravity itself. This first temperature is less than a subsequent second temperature, at which the profile becomes melt processable effecting radial expansion under pressure or melt fusion under pressure. At least one end of the profile remains unheated, and preferably, two ends remain unheated.

The profile is then transferred into a heated die having a cavity therein, the cavity having at least one region where an internal cross-sectional dimension of the cavity is larger than an external crosssectional dimension of said profile. The cavity temperature of the die is sufficient to heat the profile from the first temperature to the second temperature. At least one end of the profile is sealed and a pressurized medium is injected into an opposed end of the profile to conform the formable portions of the profile with the internal diameter of the cavity, thereby creating the profile. The profile is cooled and depressurized profile removed from the die.

In one embodiment of the invention, the first temperature is greater than or equal to approximately 40° C. which is less than or equal to approximately 95% of said second temperature, the numeric value of this second temperature being dependent upon various factors, e.g., polymer, filler, additives, etc. In a more preferred embodiment, said first temperature is greater than or equal to approximately 65° C. and less than or equal to approximately 95% of the second temperature. Phrased somewhat differently and not identically, although similar in concept, a temperature difference between the first and second temperatures is between approximately 5 and 30% inclusive when compared to the second temperature. More preferably, this difference will be between approximately 8 and 15% inclusive. One of the key aspects of this invention is the recognition of the need to minimize the amount of heating necessary to increase the temperature of the profile from the first temperature to the second temperature, while still maintaining a sufficient degree of structural integrity of the profile so as to permit physical movement from the profile heating means into a heated die without a total collapse of the walls of the profile either due to gravity or to physical manipulation.

The die cavity typically has at least two bends wherein each of the at least two bends defines an angle and an associated plane, such that a first bend and at least one other of the at least two bends lie in intersecting planes. One of the keys to the process is the recognition that at least one end of the profile remains unheated so that either by physical operative means, or user interactive means using heat-protective gloves for example, the profile is transferred from the heated profile heating means to the heated die by the unheated end. In a preferred embodiment, suction will be applied to the cavity to facilitate the expansion in cross-section dimension of the heated profile thereby decreasing the amount of pressure required.

When preheating the extruded profile, it should be recognized that heating is not limited to any one direction, e.g., from exterior to interior. It is possible to use heated gas to heat the profile in the opposite direction, e.g., from interior to exterior. In yet another embodiment, it is possible to heat the part from both direction, but using externally applied heat in conjunction with interior heated gas or other fluid, whether liquid or gas. By preheating the profile, it is possible to use thicker profiles, and thereby permit the degree of expansion to be increased, in a cost-effective and equally important, time-effective manner.

Preheating also permits the use of dies or molds which have no moving parts. For example, the profile shown in FIG. 3 is made using a split mold with no moving parts other than a hinged mechanism to permit opening and closing of the mold or die. The fact that the profile is pre-heated permits the operator to insert the profile into the die cavity by physically bending the profile to fit the contour of the interior of the cavity of the die. Since this initial first processing temperature is less than the melt processing temperature, the profile does not stick to itself during this physical manipulative sequence since there is still some structural integrity to the profile at this temperature, yet the modulus of the profile is not so high as to have the profile return to its essentially originally linear shape after removal of the physical force required to bend the profile to fit the contour of the die cavity.

This invention has been described in detail with reference to specific embodiments thereof, including the respective best modes for carrying out each embodiment. It shall be understood that these illustrations are by way of example and not by way of limitation.

What is claimed is:

1. A process for manufacturing a polymeric profile, comprising the steps of:
    (a) heating a portion of an extruded profile in a preheated profile heating means to a first temperature at which said heated portion of said profile becomes formable, said first temperature being lower than a second temperature at which the profile becomes melt processable, while maintaining at least one end of said profile unheated;
    (b) transferring said extruded profile into a heated die having a cavity therein, said cavity having at least one region where an internal cross-sectional dimension of the cavity is larger than an external cross-sectional dimension of said profile, a cavity temperature of said die being at a temperature which is sufficient to heat the profile from said first temperature to said second temperature;
    (c) sealing at least one end of said profile;
    (d) injecting a pressurized medium into an open end of the profile to conform the heated portion of the profile to the internal diameter of the cavity, creating a modified profile;
    (e) cooling and depressurizing the modified profile; and
    (f) removing the cooled modified profile from the die.

2. The process of claim 1 wherein said first temperature is greater than or equal to approximately 40° C. and less than or equal to approximately 95% of said second temperature.

3. The process of claim 2 wherein said first temperature is greater than or equal to approximately 65° C. and less than or equal to approximately 95% of said second temperature.

4. The process of claim 1 wherein a difference between said first and second temperatures is between approximately 5 and 30% inclusive of said second temperature.

5. The process of claim 4 wherein the difference between said first and second temperatures is between approximately 8 and 15% inclusive of said second temperature.

6. The process of claim 1 wherein said cavity in said die has at least two bends wherein each of the at least two bends defines an angle and an associated plane, such that a first bend and at least one other of the at least two bends lie in intersecting planes.

7. The process of claim 6 wherein the die is a split mold die with no moving components.

8. The process of claim 7 wherein said profile is transferred from said heated profile heating means to said heated die by said unheated end.

9. The process of claim 1 wherein said step of injecting further comprises applying suction to said cavity.

10. The process of claim 1 which further comprises compression molding at least one end on said modified profile.

11. The process of claim 10 wherein the step of compression molding comprises molding an end cap comprising the steps of:
    (a) inserting a first end of said modified profile through a female end cap die, the female end cap die surrounding a portion of an outer diameter of the first end and having a projection adapted to cooperate with a recess of a male end cap die;
    (b) heating a portion of the modified profile projecting from the female end cap die sufficiently to make such projecting portion pliable enough to form; and
    (c) forming the heated portion of the modified profile into a end cap by the cooperation of the projection of the female end cap die and recess of the male end cap die by closing the female and male end cap dies, the end cap die further comprising:
        (i) an end face and
        (ii) a sealing means with a centrally disposed aperture therethrough.

12. The process of claim 11 wherein the sealing means is selected from the group consisting of a radiused sealing means and a conical sealing means.

13. The process of claim 11 which further comprises insertion of a separate sealing means which is softer than the modified profile over the end face of the cap so as to form a nose cone.

14. The process of claim 10 wherein the step of compression molding comprises forming a belled end comprising the steps of:
    (a) inserting an end of the modified profile through a female belling die, the female belling die surrounding a first outer diameter of the profile and having a projection adapted to cooperate with a recess of a male belling die;
    (b) heating a portion of the modified profile projecting from the female belling die sufficiently to make such projecting portion pliable enough to form;
    (c) forming the heated portion of the modified profile into the belled end by the cooperation of the recess of the male belling die and the projection of the female belling die by closing the male and female belling dies.

15. The process of claim 14 which further comprises the step of:
    (a) placing the projecting end of the modified profile partially on an elongated male belling die projection of the male belling die with the projection closely conforming to a first internal diameter of the projecting end of the modified profile, the male belling die including a recess which increases from the first internal diameter to a second internal diameter and correspondingly increases from a first outer diameter to a second outer diameter so as to maintain at least the same thickness, from which the male die projection projects axially and concentrically.

16. The process of claim 1 which further comprises overmolding at least one second polymer having a second polymeric composition onto said modified profile having a first polymeric composition.

17. The process of claim 16 wherein the step of overmolding comprises:
    (a) inserting a first end of a rigid core insert into a closely-fitting hollow end of said modified profile having said first polymeric composition, said cylindrical core insert comprising a non-ribbed end for insertion into the end of said modified profile;

(b) injection overmolding said second polymer having said second polymeric composition over at least a portion of the end of said modified profile and over at least a portion of the core insert thereby forming a connector having an overmolded flexible segment;

(c) removing the overmolded flexible segment from the core insert by application of a longitudinal axial force.

18. The process of claim 17 wherein
(a) said core insert further comprises a ribbed portion and
(b) said step of molding the second polymer having the second polymeric composition also comprises molding said second polymer over at least a portion of the ribbed portion of the core.

19. The process of claim 18 which further comprises:
(a) sealing at least one end of the modified profile with a sealing means;
(b) pressurizing the modified profile by injecting a pressurized medium into an open end of the modified profile with a controllable pressurizing means to an internal pressure at which radial expansion of the ribbed segment will permit longitudinal movement of the ribbed segment over the ribbed portion of the core insert; and
(c) removing the overmolded flexible ribbed segment by application of a longitudinal axial force.

20. The process of claim 19 wherein the pressurizing means is a controllable supply of a compressible gas.

21. The process of claim 20 wherein the step of pressurizing the modified profile is to a pressure from about 20 to about 100 psig.

22. The process of claim 19 wherein the step of sealing the end of the tube with the sealing means is with a tapered plug.

23. The process of claim 17 wherein the step of overmolding occurs in a split die having a cavity therein.

24. The process of claim 16 wherein
(a) the first polymeric composition is a thermoplastic and
(b) the second polymeric composition is selected from the group consisting of thermoplastic elastomers and rubbers having a Shore A durometer from approximately 45–85 inclusive.

25. The process of claim 24 wherein the first and second polymeric compositions are selected independently from the group consisting of polyacetals, poly(meth)acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones, polyethersufones, polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bismaleimides, epoxy resins, phenolic resins, unsaturated thermoset polyesters, thermoset polyimides, polyurethanes, urea and melamine formaldehyde resins.

26. The process of claim 24 wherein the first polymeric composition of said modified profile has a higher melt temperature than the second polymeric composition.

27. The process of claim 17 wherein an exterior diameter of the core insert is in frictional engagement with an internal diameter of the core insert.

28. The process of claim 16 wherein the second polymeric composition is in leak-proof engagement with the first polymeric composition of said modified profile by having at least a portion of the second polymeric composition which is melt fusible with at least a portion of the first polymeric composition at an interface of the first and second polymeric compositions.

29. The process of claim 28 wherein
(a) the first polymeric composition of said modified profile is a polypropylene; and
(b) the second polymeric composition is a thermoplastic elastomer.

30. The process of claim 28 wherein the first and second polymeric compositions are different.

31. The process of claim 16 wherein the second polymeric composition is in leak-proof engagement with the first polymeric composition by having at least a portion of the second polymeric composition which is at least partially miscible with at least a portion of the first polymeric composition at an interface of the first and second polymeric compositions.

32. The process of claim 16 wherein the second polymeric composition is in leak-proof engagement with the first polymeric composition, said leak-proof engagement being effected by a relaxation of internal stresses within the second polymeric composition thereby permitting a shrinking of the second polymeric composition about an exterior diameter of the first polymeric composition.

33. The process of claim 16 wherein said step of overmolding is onto a non-end region of the modified profile.

34. The process of claim 1 which further comprises blow molding a check valve into said modified profile.

35. The process of claim 34 which further comprises the steps of:
(a) heating at least a portion of the modified profile in a non-end region of the profile;
(b) inserting a ball into said heated portion of the profile, said ball having a diameter which permits insertion into the modified profile;
(c) inserting the heated portion of the connector into a check valve mold having a check valve cavity, said check valve cavity having
(i) a plurality of expanded ribs on one side of the check valve cavity and a corresponding number of valleys between said ribs, an internal diameter of the valleys being smaller than the diameter of the ball, and
(ii) a restricted neck region at an opposed side of the check valve cavity, said restricted neck region having a smaller diameter than the diameter of the ball;
(d) cooling said heated modified profile; and
(e) removing said modified profile from said die.

36. The process of claim 35 wherein
(a) said step of inserting the ball occurs subsequent to the cooling of said modified profile, but yet when said profile is still at a temperature which permits radial expansion of the restricted neck region by the application of a longitudinal force on the ball in that neck region, and
(b) return of said restricted neck region to said smaller diameter than that of the diameter of the ball.

37. The process of claim 1 which further comprises blow molding a ribbed segment into said extruded profile in a non-end region of the modified profile.

38. The process of claim 1 wherein an initial degree of crosslinking of the profile prior to heating to said first temperature is less than or equal to 50%.

39. The process of claim 38 wherein the initial degree of crosslinking of the profile prior to heating to said first temperature is less than or equal to 35%.

40. The process of claim 38 wherein a final degree of crosslinking of the modified profile after heating said profile to said second temperature and after curing is greater than or equal to 60%.

41. The process of claim 40 wherein said final degree of crosslinking of the modified profile after heating said profile to said second temperature and after curing is greater than or equal to 85%.

42. The process of claim 1 wherein an initial degree of crosslinking of the profile prior to heating to said first temperature is less than or equal to 50% and a final degree of crosslinking of said modified profile after curing is greater than or equal to 60%.

43. The process of claim 42 wherein said initial degree of crosslinking of the profile prior to heating to said first temperature is less than or equal to 35% and said final degree of crosslinking of said modified profile after curing is greater than or equal to 85%.

44. A process for manufacturing a polymeric profile, comprising the steps of:
(a) heating a portion of an initial profile having at least two ends in a heating means to a first temperature at which said heated portion of said initial profile becomes formable, said first temperature being lower than a second temperature at which the initial profile becomes melt processable, while maintaining at least one end of said profile unheated;
(b) transferring said initial profile into a heated die having a cavity therein, said cavity having at least one region where an internal cross-sectional dimension of the cavity is larger than an external cross-sectional dimension of said profile, a cavity temperature of said die being at a temperature which is sufficient to heat the profile from said first temperature to said second temperature;
(c) sealing at least one end of said initial profile;
(d) injecting a pressurized medium into an open end of the initial profile to conform the heated portion of the initial profile to the internal diameter of the cavity, creating a modified profile;
(e) cooling and depressurizing the modified profile; and
(f) removing the cooled modified profile from the die.

45. The process of claim 44 wherein said first temperature is greater than or equal to approximately 40° C. and less than or equal to approximately 95% of said second temperature.

46. The process of claim 45 wherein said first temperature is greater than or equal to approximately 65° C. and less than or equal to approximately 95% of said second temperature.

47. The process of claim 44 wherein a difference between said first and second temperatures is between approximately 5 and 30% inclusive of said second temperature.

48. The process of claim 47 wherein the difference between said first and second temperatures is between approximately 8 and 15% inclusive of said second temperature.

49. The process of claim 44 wherein said cavity in said die has at least two bends wherein each of the at least two bends defines an angle and an associated plane, such that a first bend and at least one other of the at least two bends lie in intersecting planes.

50. The process of claim 49 wherein the die is a split mold die with no moving components.

51. The process of claim 50 wherein said initial profile is transferred from said heated profile heating means to said heated die by said unheated end.

52. The process of claim 44 wherein said step of injecting further comprises applying suction to said cavity.

53. The process of claim 44 which further comprises compression molding at least one end on said modified profile.

54. The process of claim 53 wherein the step of compression molding comprises molding an end cap comprising the steps of:
(a) inserting a first end of said modified profile through a female end cap die, the female end cap die surrounding a portion of an outer diameter of the first end and having a projection adapted to cooperate with a recess of a male end cap die;
(b) heating a portion of the modified profile projecting from the female end cap die sufficiently to make such projecting portion pliable enough to form; and
(c) forming the heated portion of the modified profile into a end cap by the cooperation of the projection of the female end cap die and recess of the male end cap die by closing the female and male end cap dies, the end cap die further comprising:
(i) an end face and
(ii) a sealing means with a centrally disposed aperture therethrough.

55. The process of claim 54 wherein the sealing means is selected from the group consisting of a radiused sealing means and a conical sealing means.

56. The process of claim 54 which further comprises insertion of a separate sealing means which is softer than the modified profile over the end face of the cap so as to form a nose cone.

57. The process of claim 53 wherein the step of compression molding comprises forming a belled end comprising the steps of:
(a) inserting an end of the modified profile through a female belling die, the female end cap die surrounding a portion an outer diameter of the first end and having a projection adapted to cooperate with a recess of a male belling die;
(b) heating a portion of the modified profile projecting from the female belling die sufficiently to make such projecting portion pliable enough to form;
(c) forming the heated portion of the modified profile into the belled end by the cooperation of the recess of the male belling die and the projection of the female belling die by closing the male and female belling dies.

58. The process of claim 57 which further comprises the step of:
(a) placing the projecting end of the modified profile partially on an elongated male belling die projection of the male belling die with the projection closely conforming to a first internal diameter of the projecting end of the modified profile, the male belling die including a recess which increases from the first internal diameter to a second internal diameter and correspondingly increases from a first outer diameter to a second outer diameter so as to maintain at least the same thickness, from which the male die projection projects axially and concentrically.

59. The process of claim 44 which further comprises overmolding at least one second polymer having a second polymeric composition onto said modified profile having a first polymeric composition.

60. The process of claim 59 wherein the step of overmolding comprises:
   (a) inserting a first end of a rigid core insert into a closely-fitting hollow end of said modified profile having said first polymeric composition, said cylindrical core insert comprising a non-ribbed end for insertion into the end of said modified profile;
   (b) injection overmolding said second polymer having said second polymeric composition over at least a portion of the end of said modified profile and over at least a portion of the core insert thereby forming a connector having an overmolded flexible segment;
   (c) removing the overmolded flexible segment from the core insert by application of a longitudinal axial force.

61. The process of claim 60 wherein
   (a) said core insert further comprises a ribbed portion and
   (b) said step of molding the second polymer having the second polymeric composition also comprises molding said second polymer over at least a portion of the ribbed portion of the core.

62. The process of claim 61 which further comprises:
   (a) sealing at least one end of the modified profile with a sealing means;
   (b) pressurizing the modified profile by injecting a pressurized medium into an open end of the modified profile with a controllable pressurizing means to an internal pressure at which radial expansion of the ribbed segment will permit longitudinal movement of the ribbed segment over the ribbed portion of the core insert; and
   (c) removing the overmolded flexible ribbed segment by application of a longitudinal axial force.

63. The process of claim 62 wherein the pressurizing means is a controllable supply of a compressible gas.

64. The process of claim 63 wherein the step of pressurizing the modified profile is to a pressure from about 20 to about 100 psig.

65. The process of claim 62 wherein the step of sealing the end of the tube with the sealing means is with a tapered plug.

66. The process of claim 60 wherein the step of overmolding occurs in a split die having a cavity therein.

67. The process of claim 59 wherein
   (a) the first polymeric composition is a thermoplastic and
   (b) the second polymeric composition is selected from the group consisting of thermoplastic elastomers and rubbers having a Shore A durometer from approximately 45–85 inclusive.

68. The process of claim 67 wherein the first and second polymeric compositions are selected independently from the group consisting of polyacetals, poly(meth)acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones, polyethersufones, polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bismaleimides, epoxy resins, phenolic resins, unsaturated thermoset polyesters, thermoset polyimides, polyurethanes, urea and melamine formaldehyde resins.

69. The process of claim 67 wherein the first polymeric composition of said modified profile has a higher melt temperature than the second polymeric composition.

70. The process of claim 60 wherein an exterior diameter of the core insert is in frictional engagement with an internal diameter of the core insert.

71. The process of claim 59 wherein the second polymeric composition is in leak-proof engagement with the first polymeric composition of said modified profile by having at least a portion of the second polymeric composition which is melt fusible with at least a portion of the first polymeric composition at an interface of the first and second polymeric compositions.

72. The process of claim 71 wherein
   (a) the first polymeric composition of said modified profile is a polypropylene; and
   (b) the second polymeric composition is a thermoplastic elastomer.

73. The process of claim 71 wherein the first and second polymeric compositions are different.

74. The process of claim 59 wherein the second polymeric composition is in leak-proof engagement with the first polymeric composition by having at least a portion of the second polymeric composition which is at least partially miscible with at least a portion of the first polymeric composition at an interface of the first and second polymeric compositions.

75. The process of claim 59 wherein the second polymeric composition is in leak-proof engagement with the first polymeric composition, said leak-proof engagement being effected by a relaxation of internal stresses within the second polymeric composition thereby permitting a shrinking of the second polymeric composition about an exterior diameter of the first polymeric composition.

76. The process of claim 59 wherein said step of overmolding is onto a non-end region of the modified profile.

77. The process of claim 44 which further comprises blow molding a check valve into said modified profile.

78. The process of claim 77 which further comprises the steps of:
   (a) heating at least a portion of the modified profile in a non-end region of the profile;
   (b) inserting a ball into said heated portion of the profile, said ball having a diameter which permits insertion into the modified profile;
   (c) inserting the heated portion of the connector into a check valve mold having a check valve cavity, said check valve cavity having
      (i) a plurality of expanded ribs on one side of the check valve cavity and a corresponding number of valleys between said ribs, an internal diameter of the valleys being smaller than the diameter of the ball, and
      (ii) a restricted neck region at an opposed side of the check valve cavity, said restricted neck region having a smaller diameter than the diameter of the ball;
   (d) cooling said heated modified profile; and
   (e) removing said modified profile from said die.

79. The process of claim 78 wherein
(a) said step of inserting the ball occurs subsequent to the cooling of said modified profile, but yet when said profile is still at a temperature which permits radial expansion of the restricted neck region by the application of a longitudinal force on the ball in that neck region, and
(b) return of said restricted neck region to said smaller diameter than that of the diameter of the ball.

80. The process of claim 44 which further comprises blow molding a ribbed segment into said extruded profile in a non-end region of the modified profile.

81. The process of claim 44 wherein an initial degree of crosslinking of the profile prior to heating to said first temperature is less than or equal to 50%.

82. The process of claim 81 wherein the initial degree of crosslinking of the profile prior to heating to said first temperature is less than or equal to 35%.

83. The process of claim 81 wherein a final degree of crosslinking of the modified profile after heating said profile to said second temperature and after curing is greater than or equal to 60%.

84. The process of claim 83 wherein said final degree of crosslinking of the modified profile after heating said profile to said second temperature and after curing is greater than or equal to 85%.

85. The process of claim 44 wherein an initial degree of crosslinking of the profile prior to heating to said first temperature is less than or equal to 50% and a final degree of crosslinking of said modified profile after curing is greater than or equal to 60%.

86. The process of claim 85 wherein said initial degree of crosslinking of the profile prior to heating to said first temperature is less than or equal to 35% and said final degree of crosslinking of said modified profile after curing is greater than or equal to 85%.

87. A process comprising the steps of:
(a) heating a portion of an extruded polymeric profile in a first heating means to a first temperature at which said heated portion of said profile becomes formable, said first temperature being lower than a second temperature at which the profile becomes melt processable, while maintaining at least one end of said profile unheated;
(b) transferring said heated profile into a second heating means for heating to said second temperature;
(c) melt processing said profile at said second temperature using a polymeric processing technique selected from the group consisting of blow molding, compression molding and injection overmolding to create a modified profile; and
(d) cooling the modified profile.

88. The process of claim 87 wherein said first temperature is greater than or equal to approximately 40° C. and less than or equal to approximately 95% of said second temperature.

89. The process of claim 88 wherein said first temperature is greater than or equal to approximately 65° C. and less than or equal to approximately 95% of said second temperature.

90. The process of claim 88 wherein a difference between said first and second temperatures is between approximately 5 and 30% inclusive of said second temperature.

91. The process of claim 90 wherein the difference between said first and second temperatures is between approximately 8 and 15% inclusive of said second temperature.

92. The process of claim 87 wherein said profile is transferred from said heated profile heating means to said heated die by said unheated end.

93. The process of claim 87 wherein melt processing of said profile is compression molding at least one end on said profile.

94. The process of claim 93 wherein the step of compression molding comprises molding an end cap comprising the steps of:
(a) inserting a first end of said profile at said first temperature through a female end cap die, the female end cap die surrounding a portion of an outer diameter of the first end and having a projection adapted to cooperate with a recess of a male end cap die;
(b) heating a portion of the profile projecting from the female end cap die to said second temperature; and
(c) forming the heated portion of the profile into a end cap by the cooperation of the projection of the female end cap die and recess of the male end cap die by closing the female and male end cap dies, the end cap die further comprising:
(i) an end face and
(ii) a sealing means with a centrally disposed aperture therethrough.

95. The process of claim 94 wherein the sealing means is selected from the group consisting of a radiused sealing means and a conical sealing means.

96. The process of claim 94 which further comprises insertion of a separate sealing means which is softer than the profile over the end face of the cap so as to form a nose cone.

97. The process of claim 93 wherein the step of compression molding comprises forming a belled end comprising the steps of:
(a) inserting an end of the profile at said first temperature through a female belling die, the female belling die surrounding a first outer diameter of the profile and having a projection adapted to cooperate with a recess of a male belling die;
(b) heating a portion of the profile projecting from the female belling die to said second temperature;
(c) forming the heated portion of the profile into the belled end by the cooperation of the recess of the male belling die and the projection of the female belling die by closing the male and female belling dies.

98. The process of claim 97 which further comprises the step of:
(a) placing the projecting end of the modified profile partially on an elongated male belling die projection of the male belling die with the projection closely conforming to a first internal diameter of the projecting end of the modified profile, the male belling die including a recess which increases from the first internal diameter to a second internal diameter and correspondingly increases from a first outer diameter to a second outer diameter so as to maintain at least the same thickness, from which the male die projection projects axially and concentrically.

99. The process of claim 87 wherein melt processing of said profile is injection overmolding at least one second polymer having a second polymeric composition onto said profile having a first polymeric composition.

100. The process of claim 99 wherein the step of overmolding comprises:
(a) inserting a first end of a rigid core insert into a closely-fitting hollow end of said profile having said first polymeric composition, said cylindrical core insert comprising a non-ribbed end for insertion into the end of said profile;
(b) injection overmolding said second polymer having said second polymeric composition over at least a portion of the end of said profile and over at least a portion of the core insert thereby forming a connector having an overmolded flexible segment;

(c) removing the overmolded flexible segment from the core insert by application of a longitudinal axial force.

101. The process of claim 100 wherein
(a) said core insert further comprises a ribbed portion and
(b) said step of molding the second polymer having the second polymeric composition also comprises molding said second polymer over at least a portion of the ribbed portion of the core.

102. The process of claim 101 which further comprises:
(a) sealing at least one end of the profile with a sealing means;
(b) pressurizing the profile by injecting a pressurized medium into an open end of the modified profile with a controllable pressurizing means to an internal pressure at which radial expansion of the ribbed segment will permit longitudinal movement of the ribbed segment over the ribbed portion of the core insert; and
(c) removing the overmolded flexible ribbed segment by application of a longitudinal axial force.

103. The process of claim 102 wherein the pressurizing means is a controllable supply of a compressible gas.

104. The process of claim 103 wherein the step of pressurizing the profile is to a pressure from about 20 to about 100 psig.

105. The process of claim 102 wherein the step of sealing the end of the tube with the sealing means is with a tapered plug.

106. The process of claim 102 wherein the step of overmolding occurs in a split die having a cavity therein.

107. The process of claim 99 wherein
(a) the first polymeric composition is a thermoplastic and
(b) the second polymeric composition is selected from the group consisting of thermoplastic elastomers and rubbers having a Shore A durometer from approximately 45–85 inclusive.

108. The process of claim 107 wherein the first and second polymeric compositions are selected independently from the group consisting of polyacetals, poly(meth)acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones, polyethersufones, polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bismaleimides, epoxy resins, phenolic resins, unsaturated thermoset polyesters, thermoset polyimides, polyurethanes, urea and melamine formaldehyde resins.

109. The process of claim 107 wherein the first polymeric composition of said profile has a higher melt temperature than the second polymeric composition.

110. The process of claim 99 wherein the second polymeric composition is in leak-proof engagement with the first polymeric composition of said profile by having at least a portion of the second polymeric composition which is melt fusible with at least a portion of the first polymeric composition at an interface of the first and second polymeric compositions.

111. The process of claim 110 wherein
(a) the first polymeric composition of said modified profile is a polypropylene; and
(b) the second polymeric composition is a thermoplastic elastomer.

112. The process of claim 99 wherein the second polymeric composition is in leak-proof engagement with the first polymeric composition by having at least a portion of the second polymeric composition which is at least partially miscible with at least a portion of the first polymeric composition at an interface of the first and second polymeric compositions.

113. The process of claim 99 wherein the second polymeric composition is in leak-proof engagement with the first polymeric composition, said leak-proof engagement being effected by a relaxation of internal stresses within the second polymeric composition thereby permitting a shrinking of the second polymeric composition about an exterior diameter of the first polymeric composition.

114. The process of claim 99 wherein said step of overmolding is onto a non-end region of the profile.

115. The process of claim 87 wherein melt processing of said profile further comprises blow molding a check valve into said profile.

116. The process of claim 115 which further comprises the steps of:
(a) heating at least a portion of the profile in a non-end region of the profile;
(b) inserting a ball into said heated portion of the profile, said ball having a diameter which permits insertion into the profile;
(c) inserting the heated portion of the connector into a check valve mold having a check valve cavity, said check valve cavity having
  (i) a plurality of expanded ribs on one side of the check valve cavity and a corresponding number of valleys between said ribs, an internal diameter of the valleys being smaller than the diameter of the ball, and
  (ii) a restricted neck region at an opposed side of the check valve cavity, said restricted neck region having a smaller diameter than the diameter of the ball;
(d) cooling said profile; and
(e) removing said profile from said die.

117. The process of claim 116 wherein
(a) said step of inserting the ball occurs subsequent to the cooling of said profile, but yet when said profile is still at a temperature which permits radial expansion of the restricted neck region by the application of a longitudinal force on the ball in that neck region, and
(b) return of said restricted neck region to said smaller diameter than that of the diameter of the ball.

118. The process of claim 87 wherein melt processing of said profile further comprises blow molding a ribbed segment into said extruded profile in a non-end region of the profile.

119. The process of claim 87 wherein an initial degree of crosslinking of the profile prior to heating to said first temperature is less than or equal to 50%.

120. The process of claim 119 wherein the initial degree of crosslinking of the profile prior to heating to said first temperature is less than or equal to 35%.

121. The process of claim 119 wherein a final degree of crosslinking of the profile after heating said profile to said second temperature and after curing is greater than or equal to 60%.

122. The process of claim 121 wherein said final degree of crosslinking of the profile after heating said profile to said second temperature and after curing is greater than or equal to 85%.

123. The process of claim 87 wherein an initial degree of crosslinking of the profile prior to heating to said first temperature is less than or equal to 50% and a final degree of crosslinking of said profile after curing is greater than or equal to 60%.

124. The process of claim 123 wherein said initial degree of crosslinking of the profile prior to heating to said first temperature is less than or equal to 35% and said final degree of crosslinking of said profile after curing is greater than or equal to 85%.

125. A process comprising the steps of:
(a) heating a portion of an extruded polymeric profile in a first heating means to a first temperature at which said heated portion of said profile becomes formable, said first temperature being lower than a second temperature at which the profile becomes melt processable;
(b) transferring said heated profile into a second heating means for heating to said second temperature;
(c) melt processing said profile at said second temperature using a polymeric processing technique selected from the group consisting of blow molding, compression molding and injection overmolding to create a modified profile; and
(d) cooling the modified profile.

126. The process of claim 125 wherein said first temperature is greater than or equal to approximately 40° C. and less than or equal to approximately 95% of said second temperature.

127. The process of claim 126 wherein said first temperature is greater than or equal to approximately 65° C. and less than or equal to approximately 95% of said second temperature.

128. The process of claim 126 wherein a difference between said first and second temperatures is between approximately 5 and 30% inclusive of said second temperature.

129. The process of claim 128 wherein the difference between said first and second temperatures is between approximately 8 and 15% inclusive of said second temperature.

130. The process of claim 125 wherein an initial degree of crosslinking of the profile prior to heating to said first temperature is less than or equal to 50%.

131. The process of claim 130 wherein the initial degree of crosslinking of the profile prior to heating to said first temperature is less than or equal to 35%.

132. The process of claim 130 wherein a final degree of crosslinking of the profile after heating said profile to said second temperature and after curing is greater than or equal to 60%.

133. The process of claim 132 wherein said final degree of crosslinking of the profile after heating said profile to said second temperature and after curing is greater than or equal to 85%.

134. The process of claim 125 wherein an initial degree of crosslinking of the profile prior to heating to said first temperature is less than or equal to 50% and a final degree of crosslinking of said profile after curing is greater than or equal to 60%.

135. The process of claim 134 wherein said initial degree of crosslinking of the profile prior to heating to said first temperature is less than or equal to 35% and said final degree of crosslinking of said profile after curing is greater than or equal to 85%.

* * * * *